(12) United States Patent  
Monir et al.

(10) Patent No.: US 11,880,998 B2  
(45) Date of Patent: Jan. 23, 2024

(54) SYSTEMS AND METHODS FOR AIDING A VISUAL POSITIONING SYSTEM WITH INDOOR WAYFINDING

(71) Applicant: Verizon Patent and Licensing Inc., Basking Ridge, NJ (US)

(72) Inventors: Rejaul Monir, Jamaica Hills, NY (US); Ashley A. Vogt, Columbus, OH (US); Chad Hammond, Denver, CO (US); Mithu Datta, New Providence, NJ (US); Derek Wade Ohlarik, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 61 days.

(21) Appl. No.: 17/666,812

(22) Filed: Feb. 8, 2022

(65) Prior Publication Data

US 2022/0164985 A1   May 26, 2022

Related U.S. Application Data

(63) Continuation of application No. 16/842,259, filed on Apr. 7, 2020, now Pat. No. 11,263,778.

(51) Int. Cl.  
  *G06T 7/73* (2017.01)  
  *G01C 21/20* (2006.01)  
  (Continued)

(52) U.S. Cl.  
  CPC ............. *G06T 7/74* (2017.01); *G01C 21/206* (2013.01); *G01S 19/45* (2013.01); *G06N 20/00* (2019.01); *G06T 2207/20081* (2013.01)

(58) Field of Classification Search  
  CPC ............ G06T 7/74; G06T 2207/20081; G01C 21/206; G06N 20/00; G01S 19/45  
  See application file for complete search history.

(56) References Cited

U.S. PATENT DOCUMENTS 9,204,251 B1 * 12/2015 Mendelson ........... G01C 21/206  
2005/0221890 A1 * 10/2005 Schatten ............. A63B 24/0021  
  463/30

(Continued)

OTHER PUBLICATIONS

M. Lindstrom, "Detecting and Tracking Moving Objects from a Mobile Platform using a Laser Range Scanner," Aug. 6, 2002, Proceedings 2001 IEEE/RSJ International Conference on Intelligent Robots and Systems. Expanding the Societal Role of Robotics in the Next Millennium (Cat. No. 01CH37180), pp. 1364-1369.*

(Continued)

*Primary Examiner* — Omar S Ismail

(57) ABSTRACT

A device may receive images identifying interiors of buildings and movable objects and unmovable objects located in the interiors, and may train a machine learning model with the images to generate a trained machine learning model. The device may receive an image identifying an interior portion of a building and objects located in the interior portion, and may process the image, with the trained machine learning model, to identify a movable object and an unmovable object. The device may disregard the movable object to generate an image in which data identifying the movable object has been disregarded, and may process the image in which the data identifying the movable object has been disregarded, with a visual positioning system, to determine a location of the user device in the interior portion of the building. The device may perform one or more actions based on the location of the user device.

20 Claims, 18 Drawing Sheets

(51) Int. Cl.
*G01S 19/45* (2010.01)
*G06N 20/00* (2019.01)

(56) References Cited

U.S. PATENT DOCUMENTS

| | | | | |
|---|---|---|---|---|
| 2014/0188780 | A1* | 7/2014 | Guo | G06F 16/24573 706/52 |
| 2016/0026253 | A1* | 1/2016 | Bradski | H04N 13/128 345/8 |
| 2017/0178352 | A1* | 6/2017 | Harmsen | G05D 1/106 |
| 2018/0012082 | A1* | 1/2018 | Satazoda | G06V 10/763 |
| 2018/0018502 | A1* | 1/2018 | Rao | H04B 10/1143 |
| 2018/0025500 | A1* | 1/2018 | Nielsen | G06V 20/52 382/103 |
| 2018/0045519 | A1* | 2/2018 | Ghadiok | G06F 16/2379 |
| 2019/0025853 | A1* | 1/2019 | Julian | G06V 10/764 |
| 2019/0026958 | A1* | 1/2019 | Gausebeck | H04N 13/10 |
| 2019/0051056 | A1* | 2/2019 | Chiu | G06F 16/903 |
| 2019/0178654 | A1* | 6/2019 | Hare | G06T 7/70 |
| 2019/0180104 | A1* | 6/2019 | Sheffield | G06V 20/20 |
| 2019/0286440 | A1* | 9/2019 | Leonard | G06F 8/60 |
| 2020/0019156 | A1* | 1/2020 | Drew | A47L 11/4011 |
| 2020/0195900 | A1* | 6/2020 | Sodhi | H04N 9/3194 |
| 2020/0293049 | A1* | 9/2020 | De Castro | G01C 21/206 |
| 2021/0025717 | A1* | 1/2021 | Mendez | G06T 7/73 |
| 2021/0303898 | A1* | 9/2021 | Wang | G06V 20/10 |

OTHER PUBLICATIONS

A. Mahdavi, "Vision-Based Location Sensing and Self-Updating Information Models for Simulation-Based Building Control Strategie," Sep. 2007,Proceedings: Building Simulation 2007, pp. 1291-1298.*

Runzhi Wang,"A New RGB-D SLAM Method with Moving Object Detection for Dynamic Indoor Scenes," May 14, 2019,Remote Sens. 2019, 11, 1143; doi:10.3390/rs11101143,www.mdpi.com/journal/remotesensing, pp. 1-15.*

Flikweert, Puck, "Automatic extraction of a navigation graph intended for IndoorGML from an indoor point cloud," May 29, 2019, ISPRS Annals of the Photogrammetry, Remote Sensing and Spatial Information Sciences, DOI 10.5194/isprs-annals-IV-2-W5-271-2019 pp. 271-276.*

Lindstrom, et al., "Detecting and Tracking Moving Objects from a Mobile Platform using a Laser Range Scanner", Aug. 6, 2002, Proceedings 2001 IEEE/RSJ International Conference on Intelligent Robots and Systems. Expanding the Societal Role of Robotics in the Next Millennium (Cat. No. 01CH37180), pp. 1364-1369.

Mahdavi, et al., "Vision-Based Location Sensing and Self-Updating Information Models for Simulation-Based Building Control Strategie", Sep. 2007, Proceedings: Building Simulation 2007, pp. 1291-1298.

Wang, et al., "A New RGB-D SLAM Method with Moving Object Detection for Dynamic Indoor Scenes", May 14, 2019, Remote Sens. 2019, 11, 1143; doi:10.3390/rs11101143,www.mdpi.com/journal/remotesensing, pp. 1-15.

* cited by examiner

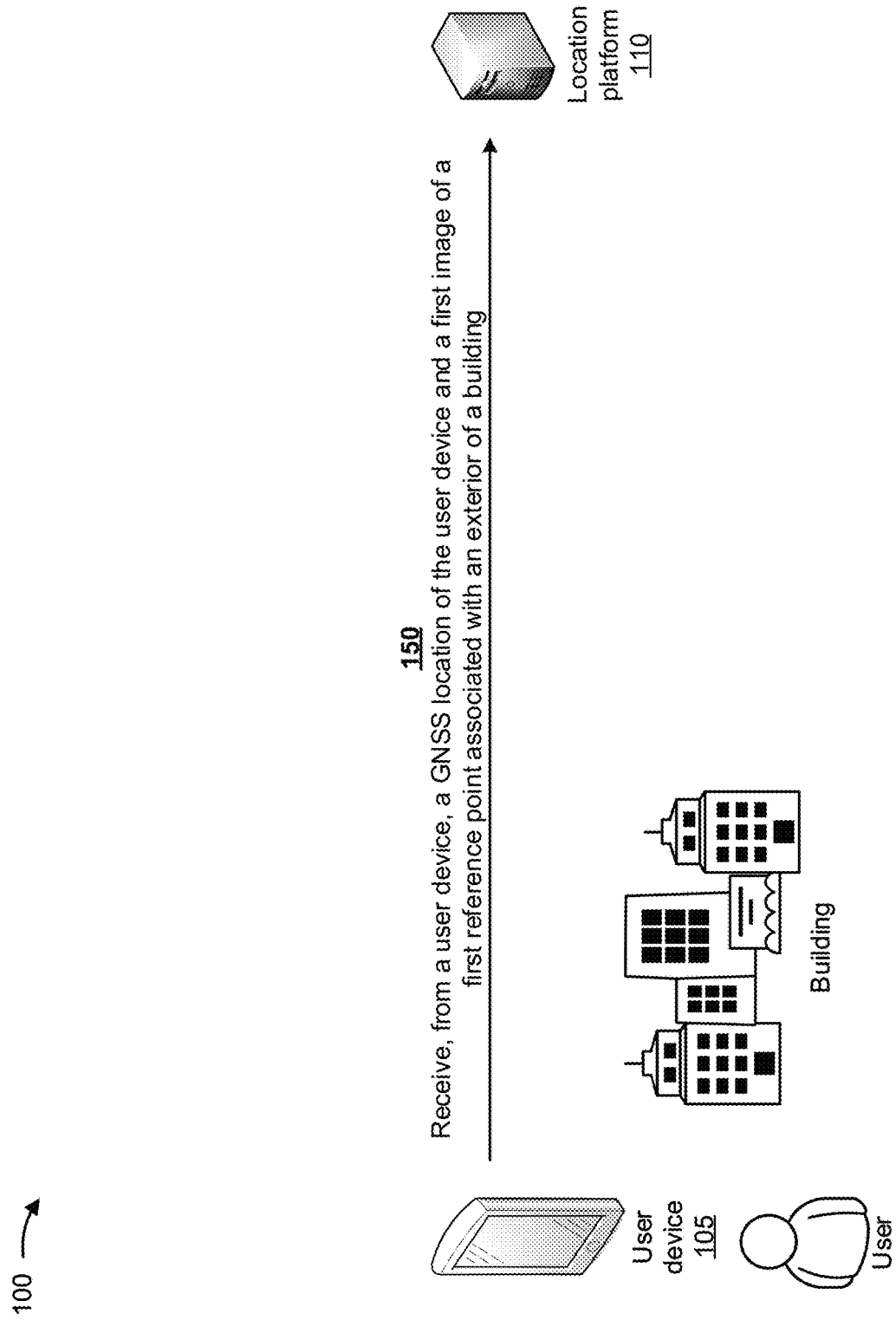

SYSTEMS AND METHODS FOR AIDING A VISUAL POSITIONING SYSTEM WITH INDOOR WAYFINDING

RELATED APPLICATION

This application is a continuation of U.S. patent application Ser. No. 16/842,259, entitled "SYSTEMS AND METHODS FOR AIDING A VISUAL POSITIONING SYSTEM WITH INDOOR WAYFINDING," filed Apr. 7, 2020, which is incorporated herein by reference in its entirety.

BACKGROUND

Previously, indoor wayfinding in a building includes people using physical maps or information desks to obtain directions inside the building. Today, indoor wayfinding provides users with a digital navigation tool that enables them to navigate inside a building using user devices (e.g., mobile devices).

BRIEF DESCRIPTION OF THE DRAWINGS

FIGS. 1A-1M are diagrams of one or more example implementations described herein.

DETAILED DESCRIPTION OF PREFERRED EMBODIMENTS

Figure 1A:
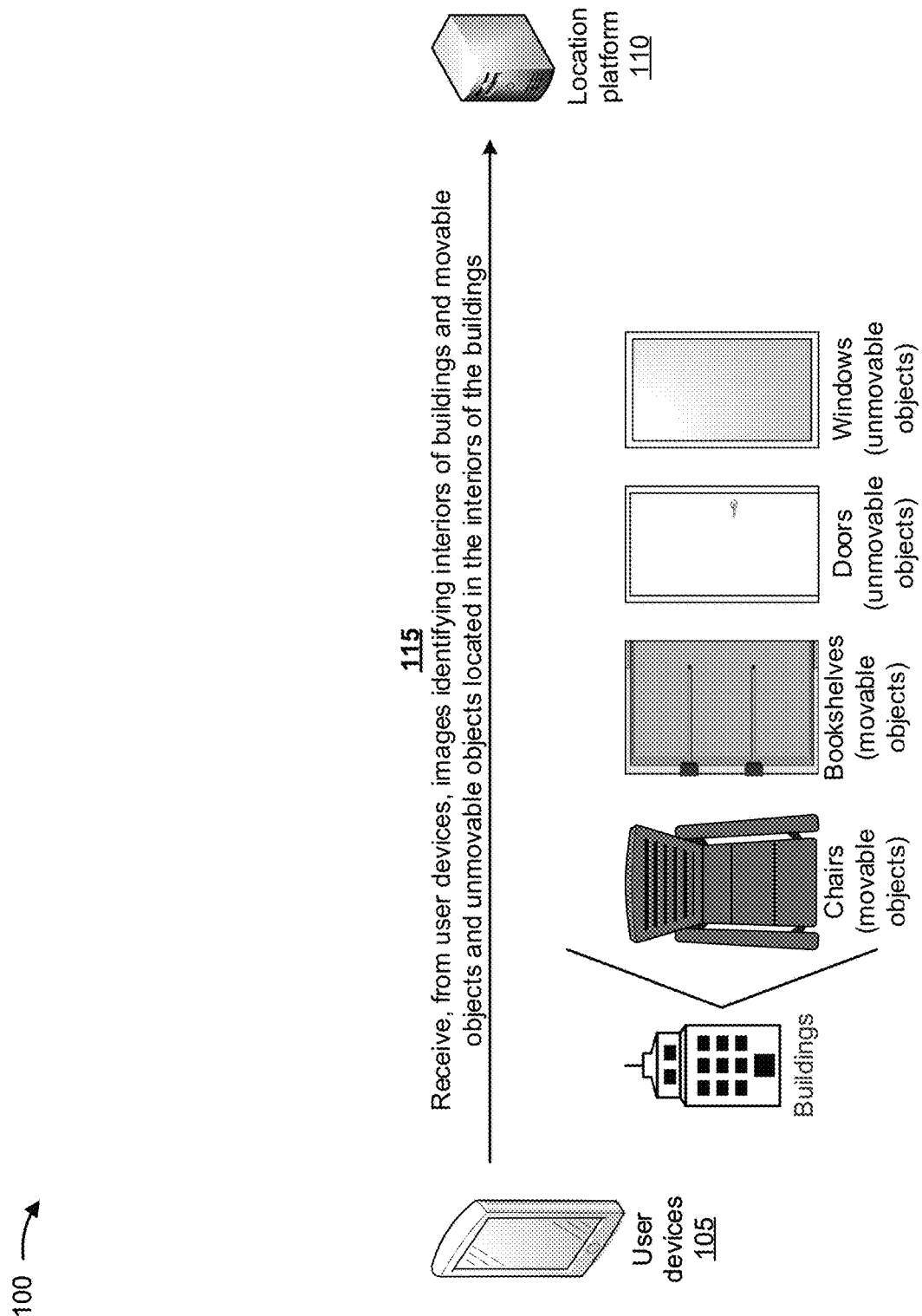

The following detailed description of example implementations refers to the accompanying drawings. The same reference numbers in different drawings may identify the same or similar elements.

Many geolocation systems, for example a global navigation satellite system (GNSS), do not work well or at all inside buildings for user devices. Thus, a user may utilize indoor wayfinding based on a positioning technology (e.g., Bluetooth beacons, WiFi positioning, positioning via magnetic fields and lighting, visual positioning systems (VPS), and/or the like) to navigate inside a building with a user device. However, when objects used as reference points by the VPS (e.g., furniture, wall paintings, statues, signs, and/or the like) are moved, the VPS may malfunction and/or underperform during indoor wayfinding. Furthermore, indoor wayfinding lacks the ability to transition from an indoor (e.g., local) coordinate system to an outdoor (e.g., global) coordinate system and vice versa. Thus, current techniques for indoor wayfinding waste computing resources (e.g., processing resources, memory resources, communication resources, and/or the like), networking resources, and/or the like associated with providing incorrect locations to user devices, providing incorrect directions to user devices based on the incorrect locations, causing excessive walking due to the incorrect locations, and/or the like.

Some implementations described herein provide a location platform that utilizes a machine learning model to aid a VPS with indoor wayfinding. For example, the location platform may receive images identifying interiors of buildings and movable objects and unmovable objects located in the interiors of the buildings (e.g., from a data structure, multiple user devices, and/or the like), and may train a machine learning model with the images to generate a trained machine learning model. The location platform may receive, from a user device, an image identifying an interior portion of a building and objects located in the interior portion of the building, and may process the image, with the trained machine learning model, to identify a movable object and an unmovable object from the objects identified in the image. The location platform may disregard data identifying the movable object from the image to generate an image in which the data identifying the movable object has been disregarded, and may process the image in which the data identifying the movable object has been disregarded, with a visual positioning system, to determine a location of the user device in the interior portion of the building. The location platform may perform one or more actions based on the location of the user device in the interior portion of the building.

In this way, the location platform utilizes a machine learning model to aid a VPS with indoor wayfinding for a user device. The machine learning model may distinguish between moveable objects and unmovable (e.g., fixed) objects in a captured image to assist the VPS with determining a location of the user device. Furthermore, the VPS enables indoor wayfinding when the user device transitions from an indoor coordinate system (e.g., a map of a building interior) to an outdoor coordinate system (e.g., GNSS) and vice versa. Thus, the location platform conserves computing resources (e.g., processing resources, memory resources, communication resources, and/or the like), networking resources, and/or the like that would otherwise be wasted in providing incorrect locations to user devices, providing incorrect directions to user devices based on the incorrect locations, causing excessive walking due to the incorrect locations, and/or the like.

FIGS. 1A-1M are diagrams of one or more example implementations 100 described herein. As shown in FIG. 1A, a user device 105 may be associated with a location platform 110. In some implementations, user device 105 may include a mobile device that includes a component (e.g., a camera) that captures images or video of surroundings of user device 105. Location platform 110 may include a platform that utilizes a machine learning model to aid a VPS with indoor wayfinding. Although several functions are described herein as being performed by location platform 110, such functions may be performed solely by user device 105, jointly by user device 105 and location platform 110, or solely by location platform 110.

As further shown in FIG. 1A, and by reference number 115, the location platform 110 may receive, from user devices 105, images identifying interiors of buildings and movable objects and unmovable objects located in the interiors of the buildings. The user devices 105 may capture images or video using one or more sensors, such as one or more cameras, video cameras, recorders, and/or the like associated with the user devices 105. In some implementations, in order for user devices 105 to capture, store, collect, process, communicate, and/or the like sensor data and/or video data, the user devices 105 may include or receive information from one or more video cameras capable of continuously capturing and/or recording video footage. In some implementations, the user devices 105 may send additional information associated with the images. For example, the user devices 105 may transmit information identifying locations of the user devices 105 as (latitude, longitude) pairs, sample timestamps, directions of user devices 105 (e.g., in degrees, where zero degrees points north), speed and altitude information associated with user devices 105, and/or the like. In some implementations, the user devices 105 may send information associated with the technology, hardware, software, and/or the like of the one or more sensors used to capture the images (e.g., focal length of a camera lens used to take an image, resolution of the image, and/or the like).

The interior of a building may have one or more movable or unmovable objects. Movable objects may include objects that are identified as temporary installments, nonfixed object, objects likely to move within a threshold period of time, and/or the like. For example, movable objects may include objects such as chairs, un-fixed tables, bookshelves, paintings, and/or the like. In some implementations, a movable object may have a property, such as a color of the object (e.g., color of a wall) that may be subject to change at a particular frequency, within a particular threshold of time, periodically, and/or the like. Unmovable objects may include objects that are typically considered permanent fixtures in a building, fixtures that are unlikely to change or move within a threshold distance (e.g., although some unmovable objects may rotate or move around, such as chairs) or period of time (e.g., a year, a decade, and/or the like), fixtures that are unlikely to change at a particular frequency, and/or the like. For example, unmovable objects may include doors, windows, walls, support beams, and/or the like. The examples listed above are not intended to limit or restrict the concept of a movable and/or unmovable object, and are merely intended to help illustrate the concept. In some implementations, the concept of a movable and/or unmovable object may be particular to a type of setting, building, and/or the like. That is, movable objects in one setting may be considered unmovable objects in another setting.

Figure 1B:
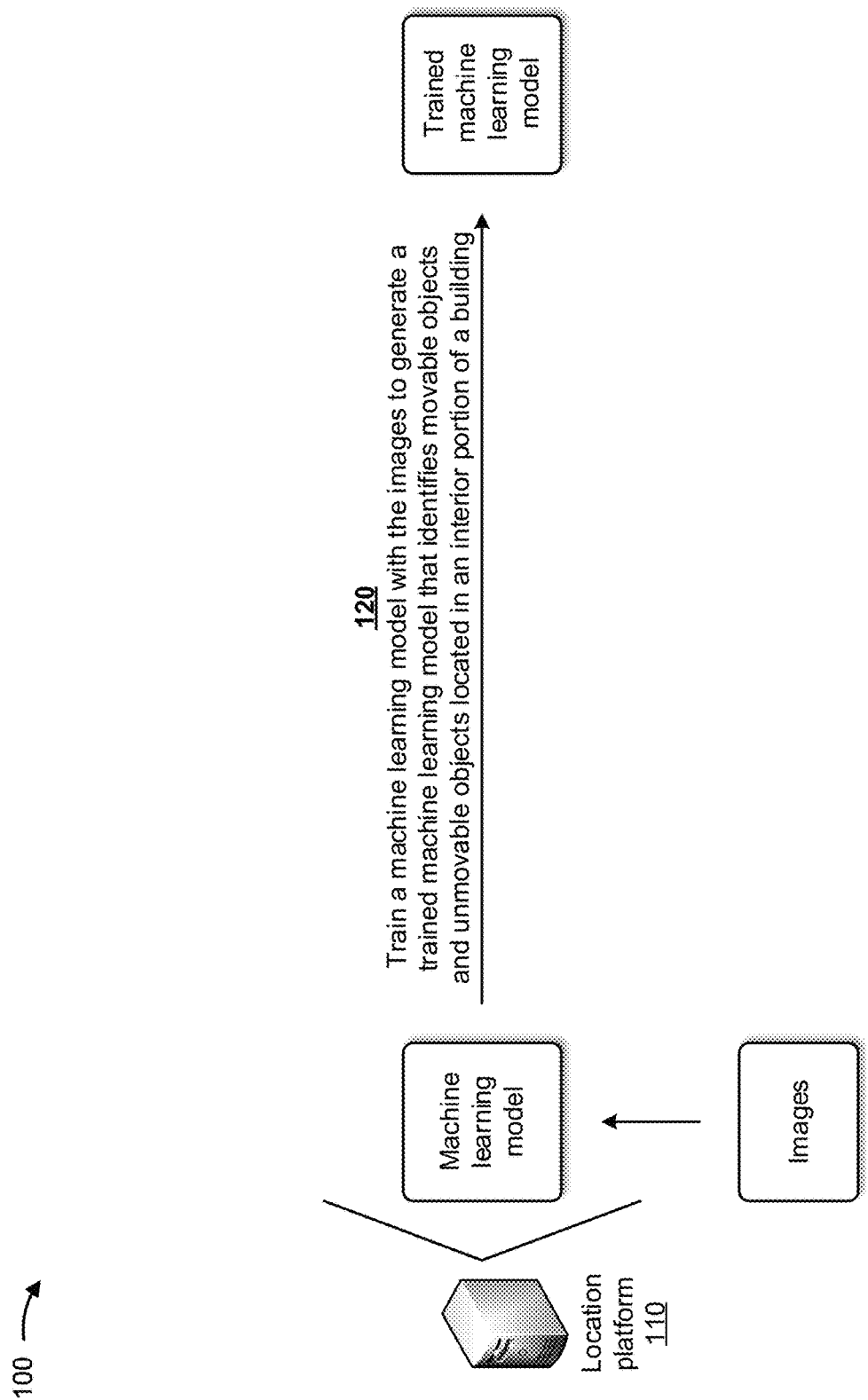

As shown in FIG. 1B, and by reference number 120, the location platform 110 may train a machine learning model with the images to generate a trained machine learning model that identifies movable objects and unmovable objects located in an interior portion of a building. In some implementations, the machine learning model may include a clustering model, a computer vision model, a classifier model, an object recognition model, and/or the like. In some implementations, location platform 110 may train the machine learning model with historical data (e.g., historical image data identifying movable objects and unmovable objects) to enable the machine learning model to distinguish between movable objects and unmovable objects in an image. For example, location platform 110 may train the machine learning model in a manner similar to the manner described below in connection with FIG. 2. In some implementations, rather than training the machine learning model, location platform 110 may obtain the machine learning model from another system or device that trained the machine learning model. In this case, location platform 110 may provide the other system or device with historical data for use in training the machine learning model, and may provide the other system or device with updated historical data to retrain the machine learning model in order to update the machine learning model.

In some implementations, location platform 110 may process an image identifying an interior of a building, with the machine learning model, to identify a movable object and an unmovable object in the image. For example, location platform 110 may apply the machine learning model to new observations (e.g., images identifying an interior of a building) in a manner similar to the manner described below in connection with FIG. 3. In this way, the location platform 110 may determine which objects may be classified as a movable or unmovable object. In some implementations, an object may be classified as a movable and/or unmovable object based on one or more attributes of the object, one or more attributes of a building associated with the object, one or more attributes of an environment associated with the object, and/or the like.

Figure 1C:
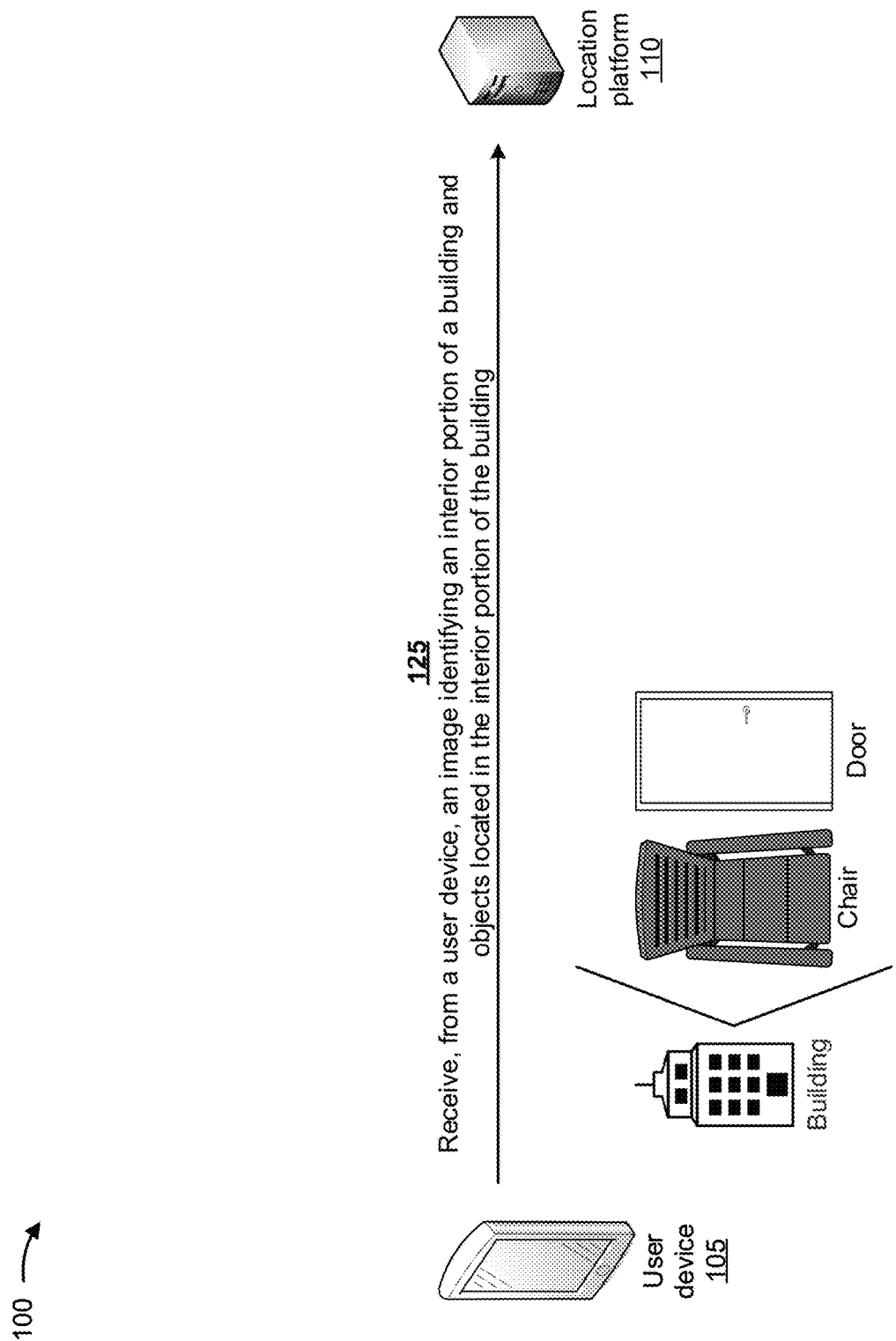

As shown in FIG. 1C, and by reference number 125, the location platform 110 may receive, from a user device 105, an image identifying an interior portion of a building and objects located in the interior portion of the building. In some implementations, the objects may include one or more objects the same as, or similar to, the objects previously identified as movable objects and/or unmovable objects. In some implementations, the objects may include one or more objects different from the objects previously identified as movable objects and/or unmovable objects. The user device 105 may capture and send images in a way similar to what was described above. For example, the user device 105 may capture images or video using one or more sensors, such as one or more cameras, video cameras, recorders, and/or the like. In some implementations, the user device 105 may include or receive information from one or more video cameras capable of continuously capturing and/or recording video footage. In some implementations, the user device 105 may send additional information associated with the images, such as information identifying a location of the user device 105 as a (latitude, longitude) pair, a sample timestamp, a direction of user device 105 (e.g., in degrees, where zero degrees points north), speed and altitude information associated with user device 105, and/or the like. In some implementations, the user device 105 may send information associated with the technology, hardware, software, and/or the like of the one or more sensors that captured the image (e.g., focal length of a camera lens used to take the image, resolution of the image, and/or the like).

Figure 1D:
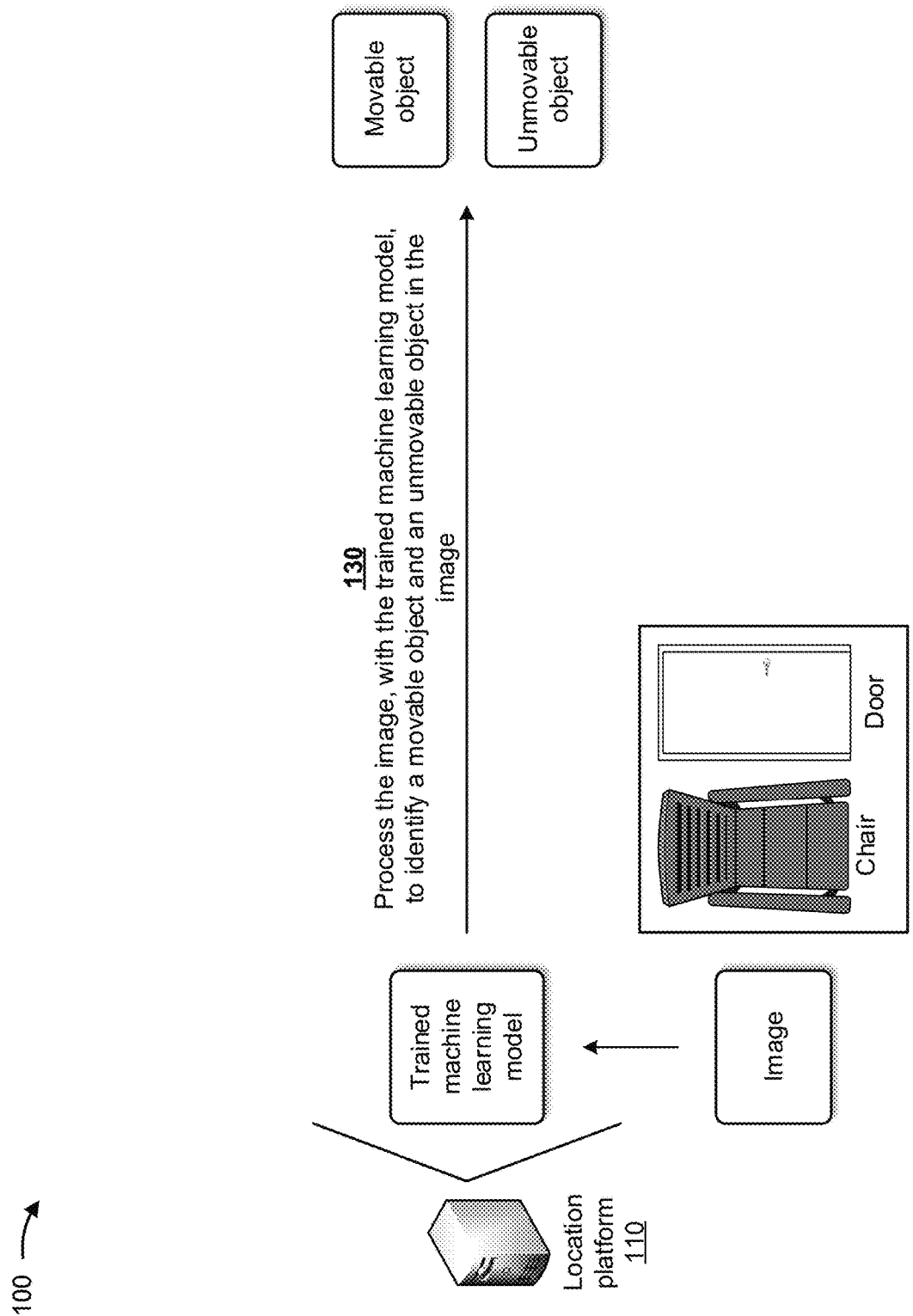

As shown in FIG. 1D, and by reference number 130, the location platform 110 may process the image, with the trained machine learning model, to identify a movable object and an unmovable object in the image. For example, the location platform 110 may perform one or more image processing techniques to determine an object in the image, one or more attributes of the object in the image, and/or the like. The location platform 110 may use the one or more attributes of the object in the image to determine whether the object is a movable object, an unmovable object, whether the object cannot be determined to be a movable and/or unmovable object, a degree of accuracy associated with the determination, and/or the like. In this way, the location platform 110 may consider particular objects as part of a building or disregard particular objects as part of the building to determine a user's location. Movable objects may disrupt location determination inside buildings through disrupting the ability of the location platform 110 to recognize particular areas inside buildings. For example, a chair may be moved from a first position to a second position inside a room, and therefore may not be helpful as a landmark in assisting in determining location (e.g., a position relative to the chair), because the position of the chair has shifted. That is, a particular room may not be recognized when compared to previous images of the room because a change in the interior configuration, such as a moved chair, has caused the room to be identified as a new room or a different room entirely. This contrasts with an unmovable object (e.g., a door, a window, and/or the like) which may not be moved from a first position to a second position, therefore providing a stable frame of reference.

In some implementations, the image processing technique may include two-dimensional (2D) object recognition, three-dimensional (3D) object recognition, image segmentation, motion detection, video tracking, feature extraction, machine learning techniques (e.g., a Viola-Jones object detection framework based on Haar features, a scale-invariant feature transform (SIFT), a histogram of oriented gradients (HOG) features, a support vector machine, a logistic regression, and/or the like), deep learning techniques, and/or the like. In some implementations, the image processing technique may include a computer vision technique that receives data from images and/or videos and extracts useful information from the data.

Figure 1E:
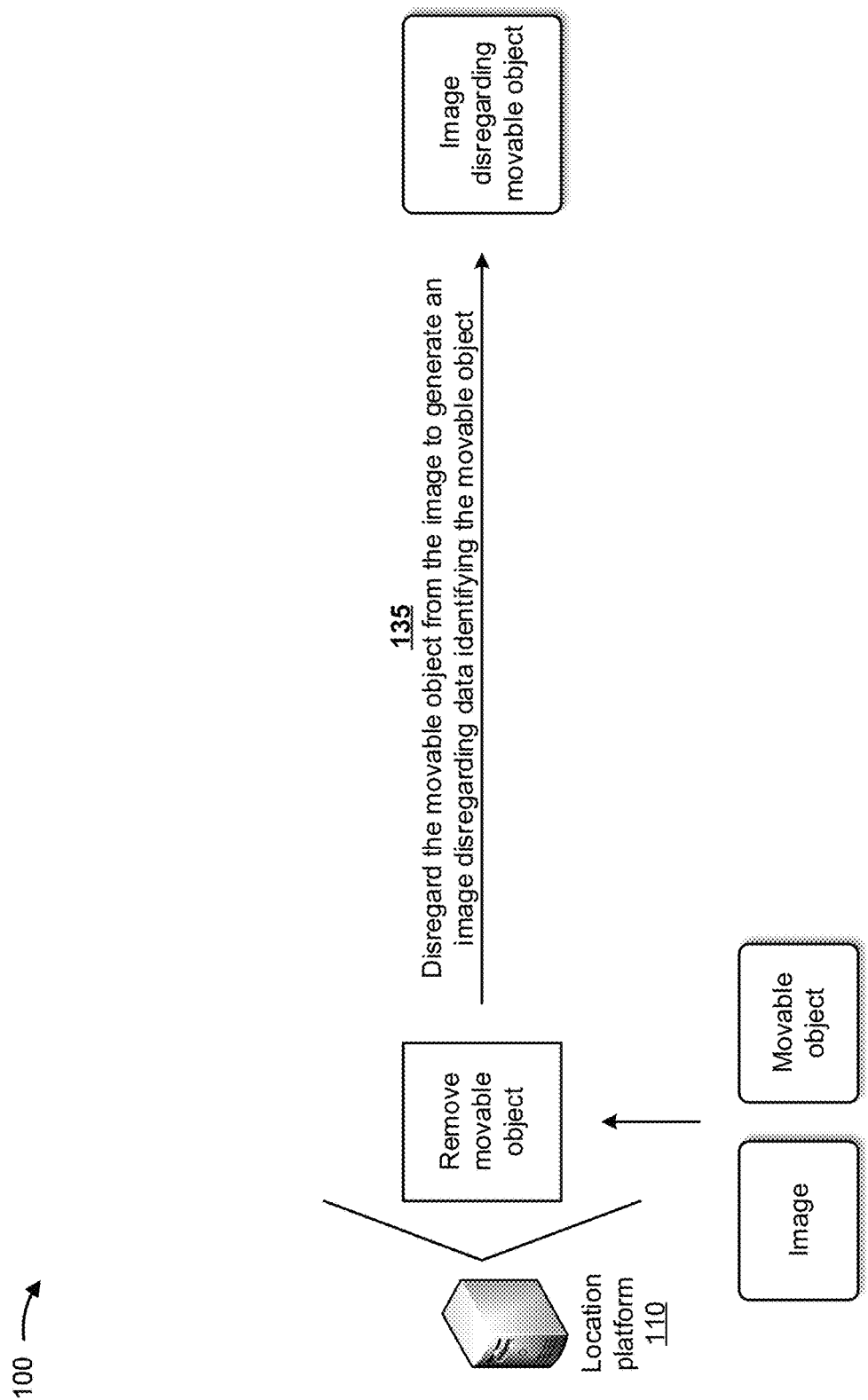

As shown in FIG. 1E, and by reference number 135, the location platform 110 may disregard the movable object from the image to generate an image in which data identifying the movable object has been disregarded. For example, the location platform 110 may use a series of image processing techniques to generate a new image without the movable object, a new image that causes a device to disregard the movable object, and/or the like. In some implementations, the location platform 110 may use one or more associated images (e.g., a historical image associated with the same room in which the current image was taken) to generate the image in which the data identifying the movable object has been disregarded. The location platform 110 may keep identified unmovable objects in the new image.

Figure 1F:
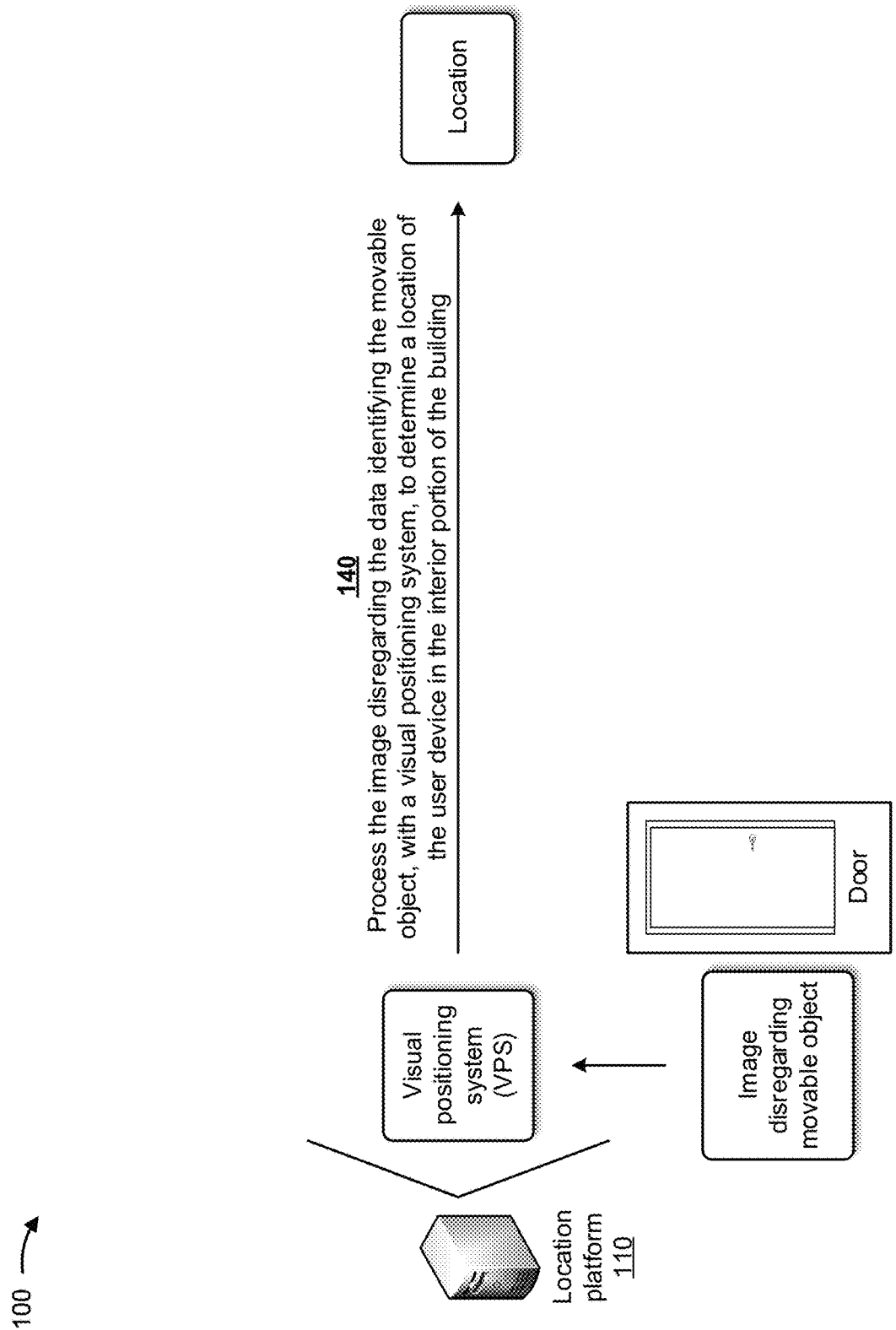

As shown in FIG. 1F, and by reference number 140, the location platform 110 may process the image in which the data identifying the movable object has been disregarded, with a visual positioning system (VPS), to determine a location of the user device 105 in the interior portion of the building. In some implementations, the location platform 110 may determine the location by determining the unmovable objects and the distance of the unmovable objects to identify a room, a sublocation, and/or the like associated with the unmovable objects and the associated distances. For example, the location platform 110 may use historical data associated with the room, the sublocation, and/or the like (e.g., unmovable objects in a room, distance of the unmovable objects relative to each other in the room, and/or the like) to determine whether the current image is associated with the particular room, sublocation, and/or the like.

In some implementations, the location platform 110 may use known objects in the building to determine a relative distance from the one or more known objects to the user device 105. For example, the location platform 110 may use image information (e.g., focal length of a lens and/or the like, a size (e.g., length, height, and/or the like) of an unmovable object in the image, and/or the like), information known about the unmovable object (e.g., actual size of the unmovable object, location of the unmovable object, and/or the like), and/or the like to determine a relative distance of the unmovable object to the user device 105. Based on determining the relative position of one or more unmovable objects to the user device 105, the location platform 110 may determine the location of the user device 105 in the interior portion of the building. In some implementations, the location platform 110 may generate a point cloud based on determining the relative distance of the unmovable object to the user device 105, a calculated size of the unmovable object, and/or the like. The location platform 110 may compare the point cloud to a historical point cloud to determine the location of the user device 105 in the interior portion of the building.

Figure 1G:
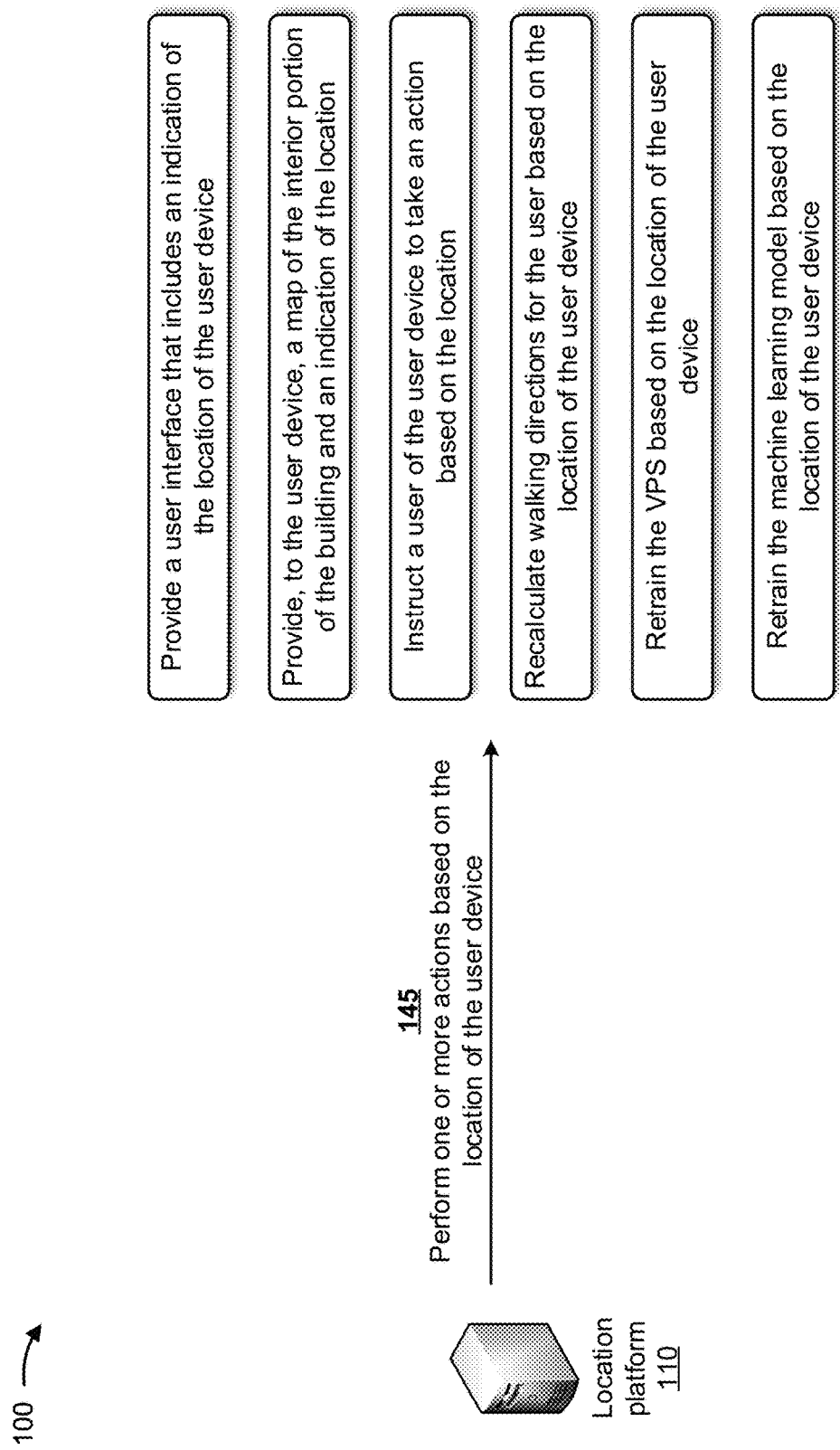

As shown in FIG. 1G, and by reference number 145, the location platform 110 may perform one or more actions based on the location of the user device 105. In some implementations, the location platform 110 may provide information based on the location of the user device 105. For example, the location platform 110 may provide a user interface that includes an indication of the location of the user device 105 to another device (such as the user device 105), provide a map of the interior portion of the building and an indication of the location to another device (such as the user device 105), instruct a user of the user device 105 to take an action based on the location, recalculate directions for the user of the user device 105 based on the location of the user device 105, and/or the like. In some implementations, the one or more actions may include the location platform 110 retraining one or more models described above and below based on the location. In this way, the location platform 110 may improve the accuracy of the one or more models in determining the location of the user device 105, determining whether to perform further processing, and/or the like, which may improve speed and efficiency of the models and conserve computing resources, networking resources, and/or the like.

In this way, several different stages of the process of indoor wayfinding via VPS are automated with a machine learning model, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes a machine learning model to aid a VPS with indoor wayfinding in the manner described herein. Finally, the process for utilizing a machine learning model to aid a VPS with indoor wayfinding conserves computing resources, networking resources, and/or the like that would otherwise be wasted in providing incorrect locations to user devices, providing incorrect directions to user devices based on the incorrect locations, causing excessive walking due to the incorrect locations, and/or the like.

As shown by FIG. 1H, and by reference number 150, the location platform 110 may receive, from a user device 105, a GNSS location of the user device 105 and a first image of a first reference point associated with an exterior of a building. In this way, the location platform 110 may obtain information to adjust with transitioning from an outdoor coordinate system to an indoor coordinate system. The user device 105 may use any of the image capturing methods described above to capture the image. For example, the user device 105 may capture images or video using one or more sensors, such as one or more cameras, video cameras, recorders, and/or the like. In some implementations, the user device 105 may include or receive information from one or more video cameras capable of continuously capturing and/or recording video footage. The user device 105 may send additional information associated with the images. For example, the user device 105 may transmit information including a timestamp, a direction of user device 105 (e.g., in degrees, where zero degrees points north), speed and altitude information associated with user device 105, and/or the like. Additionally, or alternatively, the user device 105 may send information associated with the technology, hardware, software, and/or the like of the one or more sensors used to capture the image (e.g., focal length of a camera lens used to take the image, resolution of the image, and/or the like).

Figure 1I:
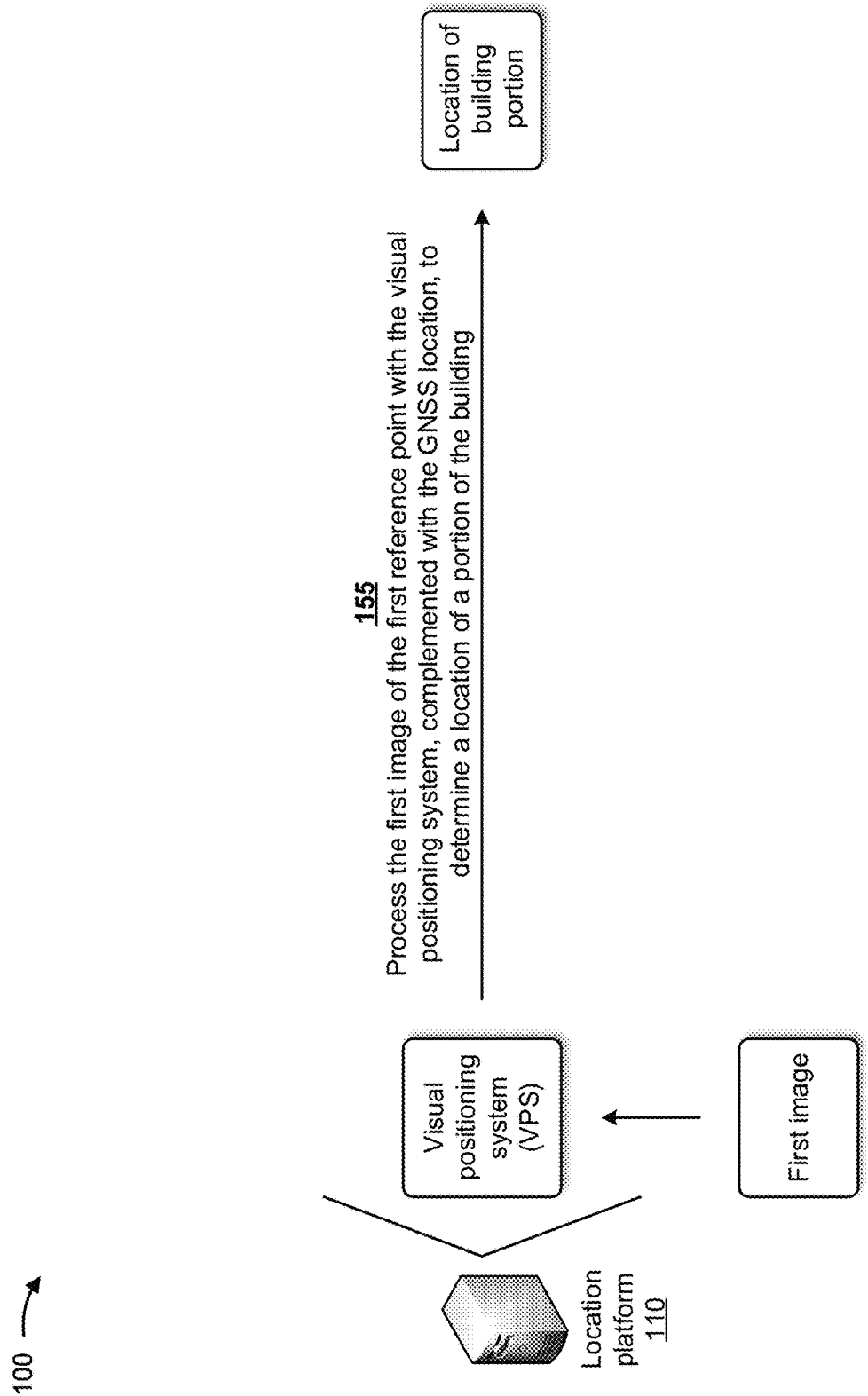

As shown by FIG. 1I, and by reference number 155, the location platform 110 may process the first image of the first reference point with the VPS, complemented with the GNSS location, to determine a location of a portion of the building. A portion of the building may be connected with a subset of shops, stores, sublocations, and/or the like within a particular radius of the portion of the building, accessible by the portion of the building, associated with the portion of the building in some way, and/or the like. The location platform 110 may apply an image processing technique to determine the portion of the building by identifying a reference point associated with the portion of the building. For example, location platform 110 may process the first image of the first reference point to determine the first reference point, one or more attributes of the first reference point, and/or the like. The location platform 110 may use one or more image processing techniques, such as those described above, to determine the location of the portion of the building. For example, the location platform 110 may use two-dimensional (2D) object recognition, three-dimensional (3D) object recognition, image segmentation, motion detection, video tracking, feature extraction, machine learning techniques (e.g., a Viola-Jones object detection framework based on Haar features, a scale-invariant feature transform (SIFT), a histogram of oriented gradients (HOG) features, a support vector machine, a logistic regression, and/or the like), deep learning techniques, and/or the like.

Figure 1J:
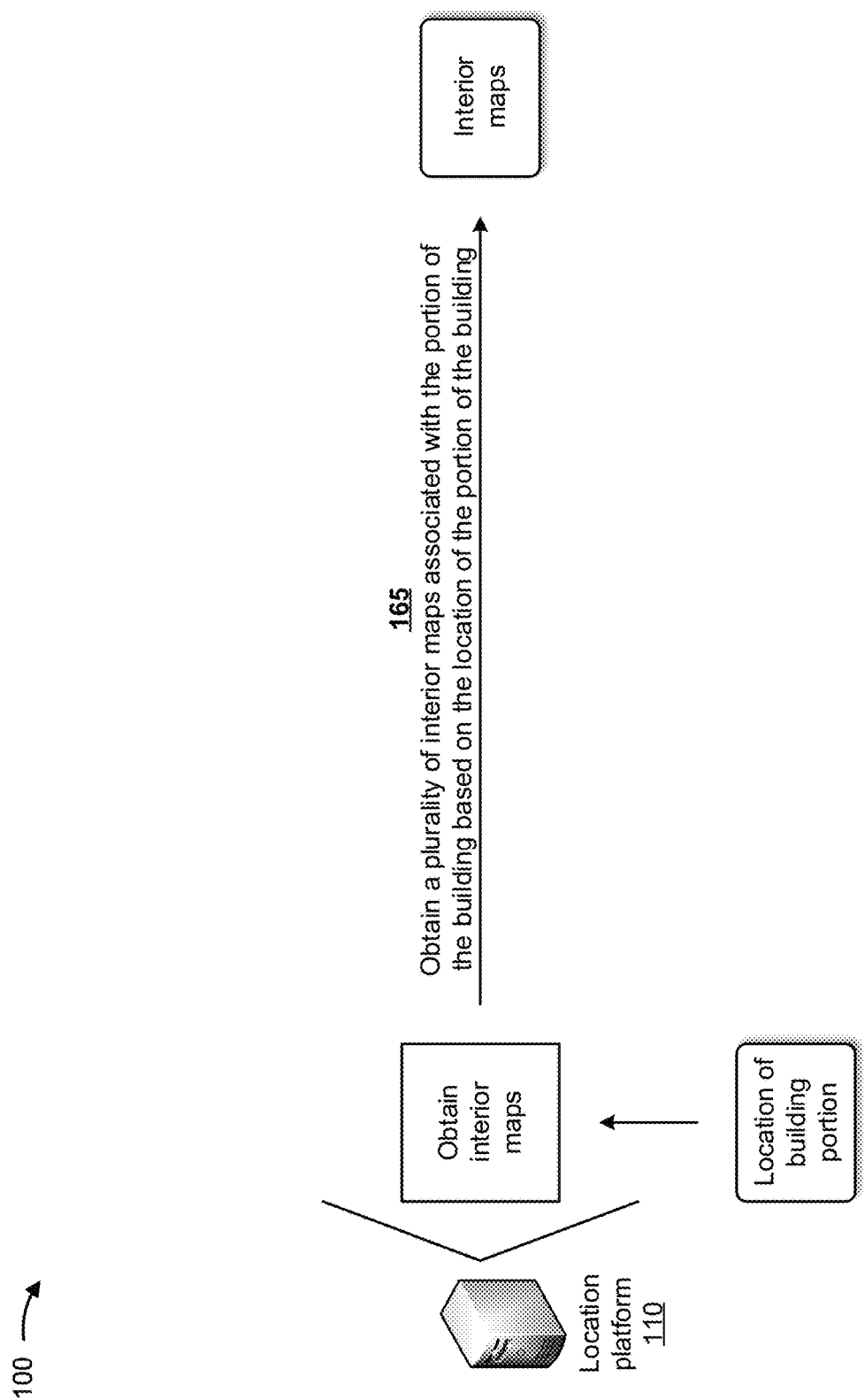

As shown by FIG. 1J, and by reference number 165, the location platform 110 may obtain a plurality of interior maps associated with the portion of the building based on the location of the portion of the building. The plurality of interior maps may indicate areas located within a threshold radius from the portion of the building, associated with the portion of the building in some way, and/or the like. In this way, the location platform 110 may obtain information relative to a user associated with the user device 105 based on the location. This may assist the user in navigating an area, especially in transitioning from an outdoor to indoor location determination system (e.g., GNSS to VPS).

Figure 1K:
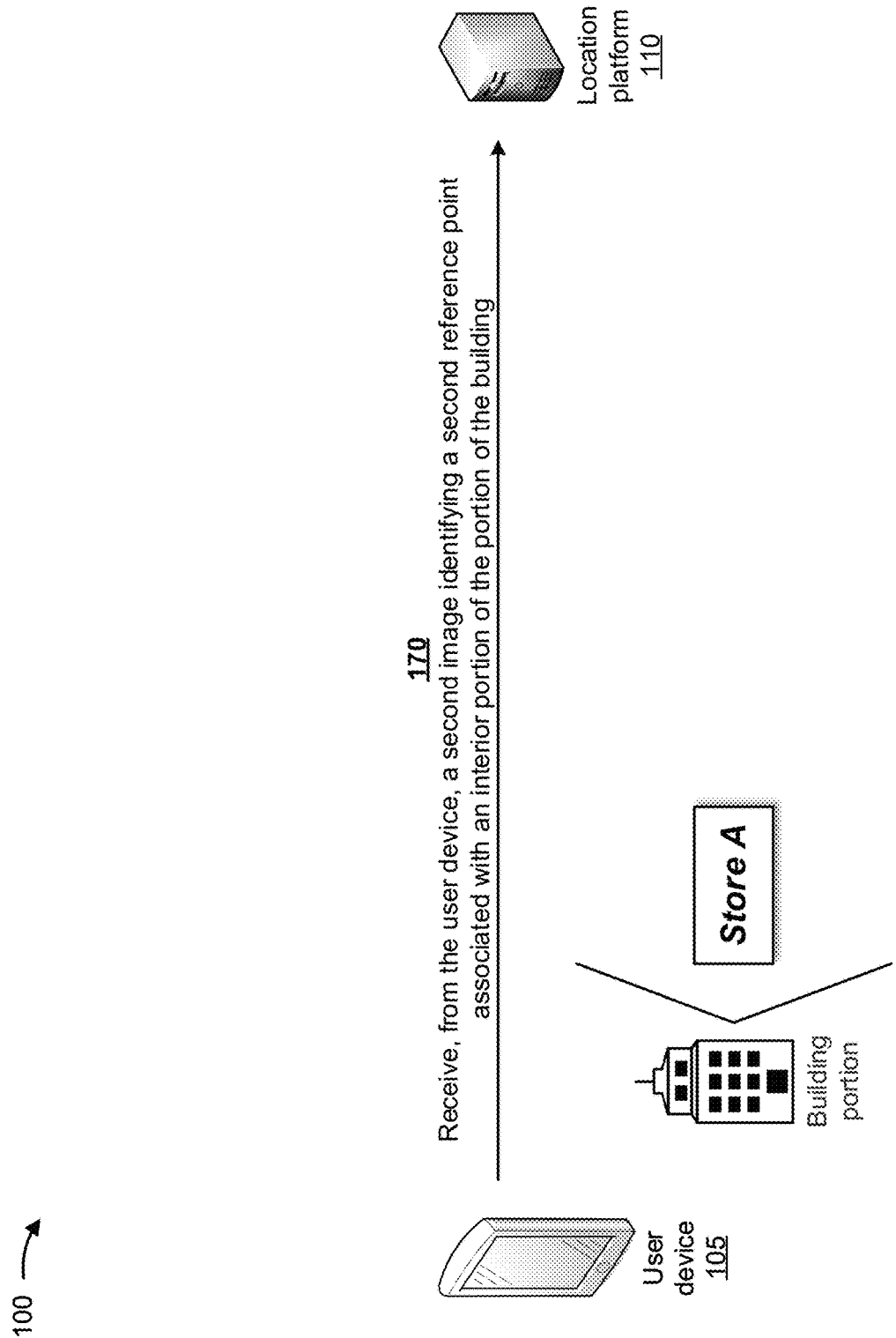

As shown by FIG. 1K, and by reference number 170, the location platform 110 may receive, from the user device 105, a second image identifying a second reference point associated with an interior portion of the portion of the building. In this way, the location platform 110 may receive information identifying that the user associated with the user device 105 has entered the building, an indoor area, and/or the like. Based on this, the location platform 110 may perform one or more actions. For example, location platform 110 may determine a transition from an outdoor (e.g., global) coordinate system to an indoor (e.g., local) coordinate system. In one example, user device 105 may capture outdoor images and may eventually capture an image of location (e.g., a mall entrance). Based on capturing the image of the location, location platform 110 may transition from an outdoor coordinate system to an indoor coordinate system. Similarly, the location platform 110 may use an indoor location determination system (e.g., VPS), instead of an outdoor location determination system (e.g., GNSS).

Figure 1L:
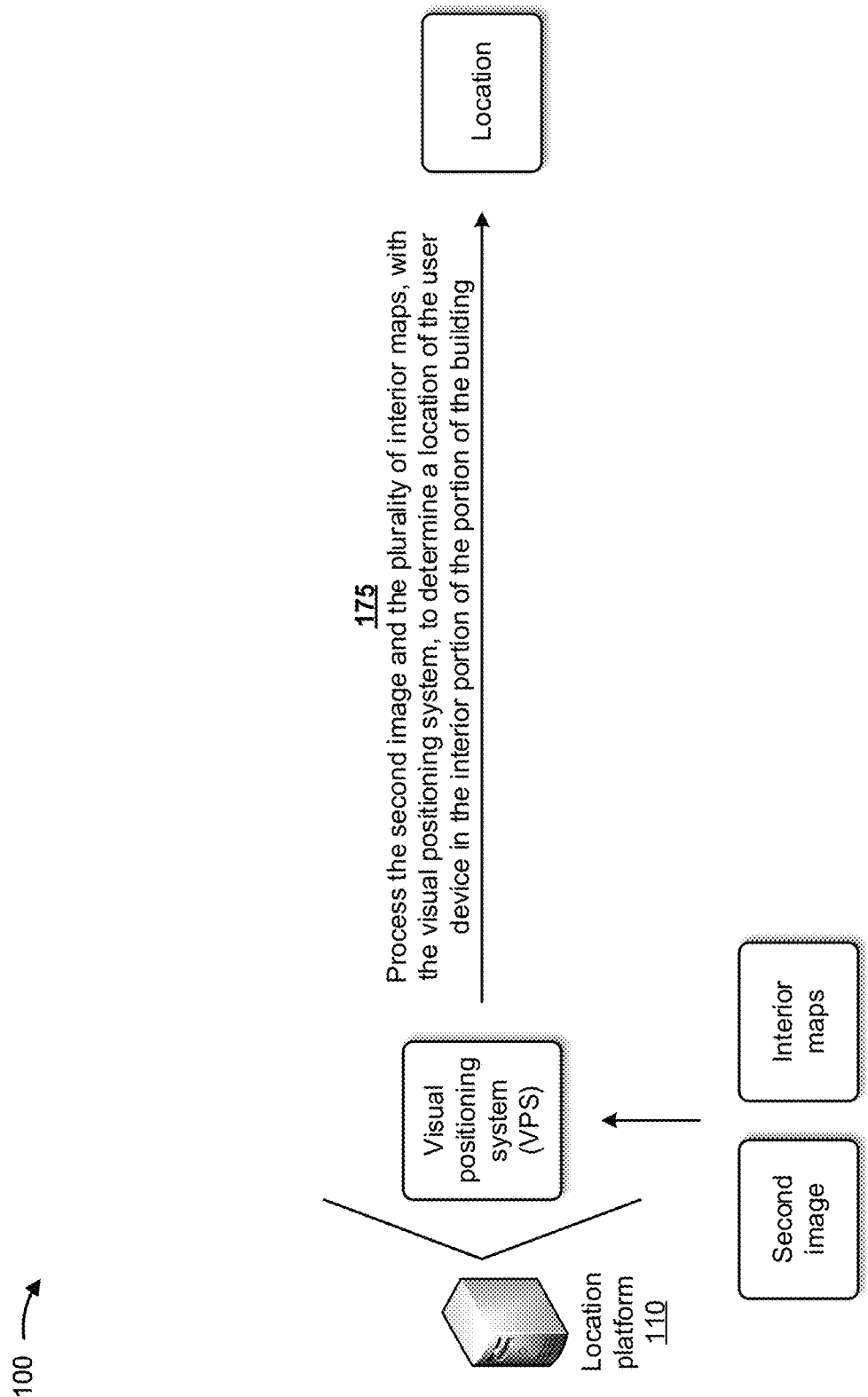

As shown in FIG. 1L, and by reference number 175, location platform 110 may process the second image and the plurality of interior maps, with the VPS, to determine a location of the user device in the interior portion of the portion of the building. Location platform 110 may use image processing techniques similar to what was described above. For example, the location platform 110 may use two-dimensional (2D) object recognition, three-dimensional (3D) object recognition, image segmentation, motion detection, video tracking, feature extraction, machine learning techniques (e.g., a Viola-Jones object detection framework based on Haar features, a scale-invariant feature transform (SIFT), a histogram of oriented gradients (HOG) features, a support vector machine, a logistic regression, and/or the like), deep learning techniques, and/or the like.

Location platform 110 may determine the location by using image processing techniques to determine an internal location by determining recognizable objects (e.g., recognizable unmovable objects). In some implementations, the location platform 110 may use techniques described above to distinguish between movable and unmovable objects. For example, the location platform 110 may identify unmovable objects using a machine learning model trained on identifying movable and unmovable objects. Based on this, the location platform 110 may only use data identifying unmovable objects to determine the internal location. For example, the location platform 110 may use historical data associated with a room, a sublocation, and/or the like (e.g., unmovable objects in the room, distance of the unmovable objects relative to each other in the room, and/or the like) to determine whether the current image is associated with the particular room, sublocation, and/or the like. In some implementations, the location platform 110 may use known objects in the building to determine a relative distance from the one or more known objects to the user device 105. Based on determining the relative position of one or more objects to the user device 105, the location platform 110 may determine the location of the user device 105 in the interior portion of the building.

Figure 1M:
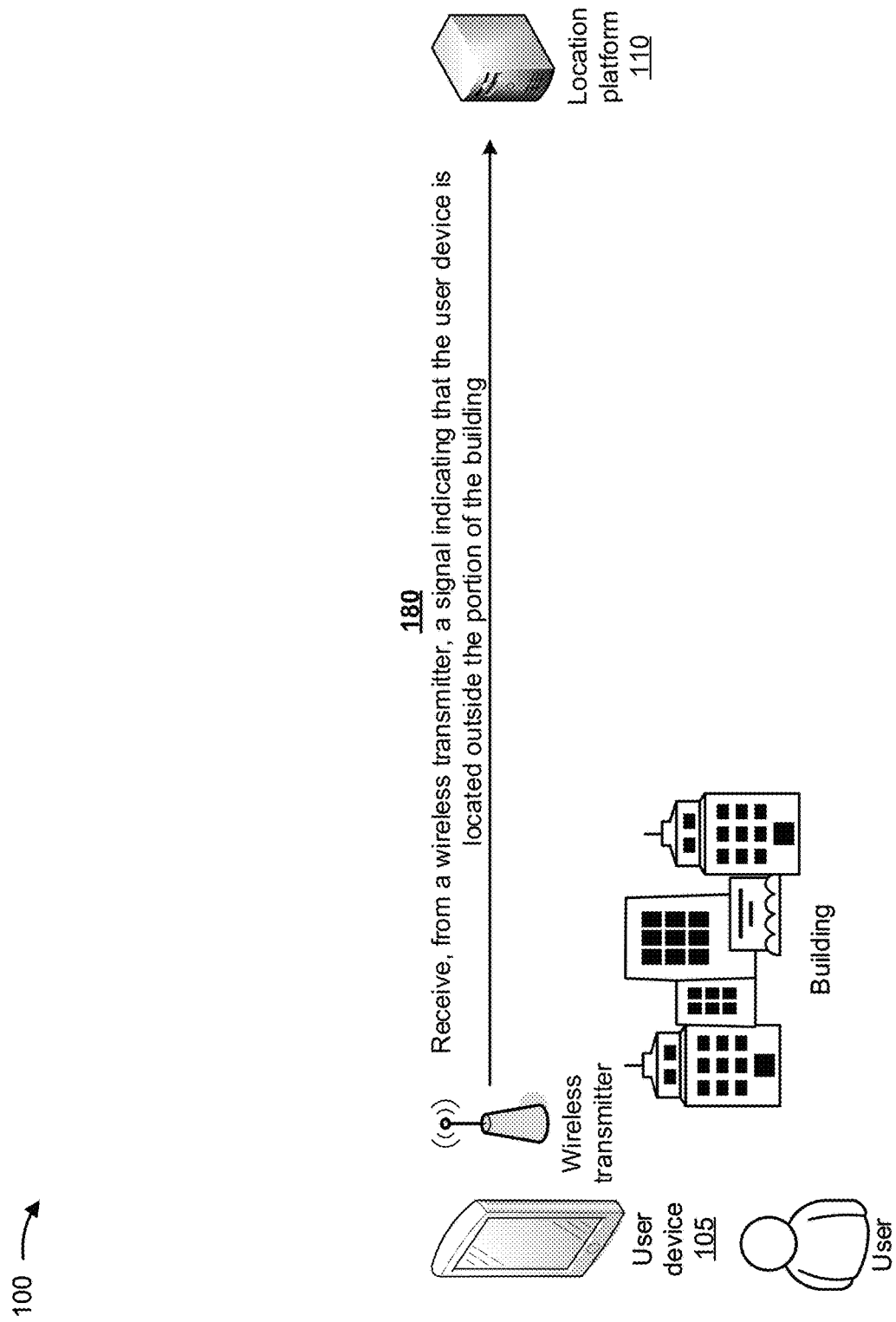

As shown in FIG. 1M, and by reference number 180, the location platform 110, may receive, from a wireless transmitter, a signal indicating that the user device 105 is located outside the portion of the building. In this way, the location platform 110 may perform one or more actions based on detecting that the user device 105 is no longer inside the building. For example, the location platform 110 may determine to transition from an indoor (e.g., local) coordinate system to an outdoor (e.g., global) coordinate system.

As indicated above, FIGS. 1A-1M are provided merely as examples. Other examples may differ from what is described with regard to FIGS. 1A-1M. The number and arrangement of devices and networks shown in FIGS. 1A-1M are provided as an example. In practice, there may be additional devices and/or networks, fewer devices and/or networks, different devices and/or networks, or differently arranged devices and/or networks than those shown in FIGS. 1A-1M. Furthermore, two or more devices shown in FIGS. 1A-1M may be implemented within a single device, or a single device shown in FIGS. 1A-1M may be implemented as multiple, distributed devices. Additionally, or alternatively, a set of devices (e.g., one or more devices) of FIGS. 1A-1M may perform one or more functions described as being performed by another set of devices of FIGS. 1A-1M.

Figure 2:
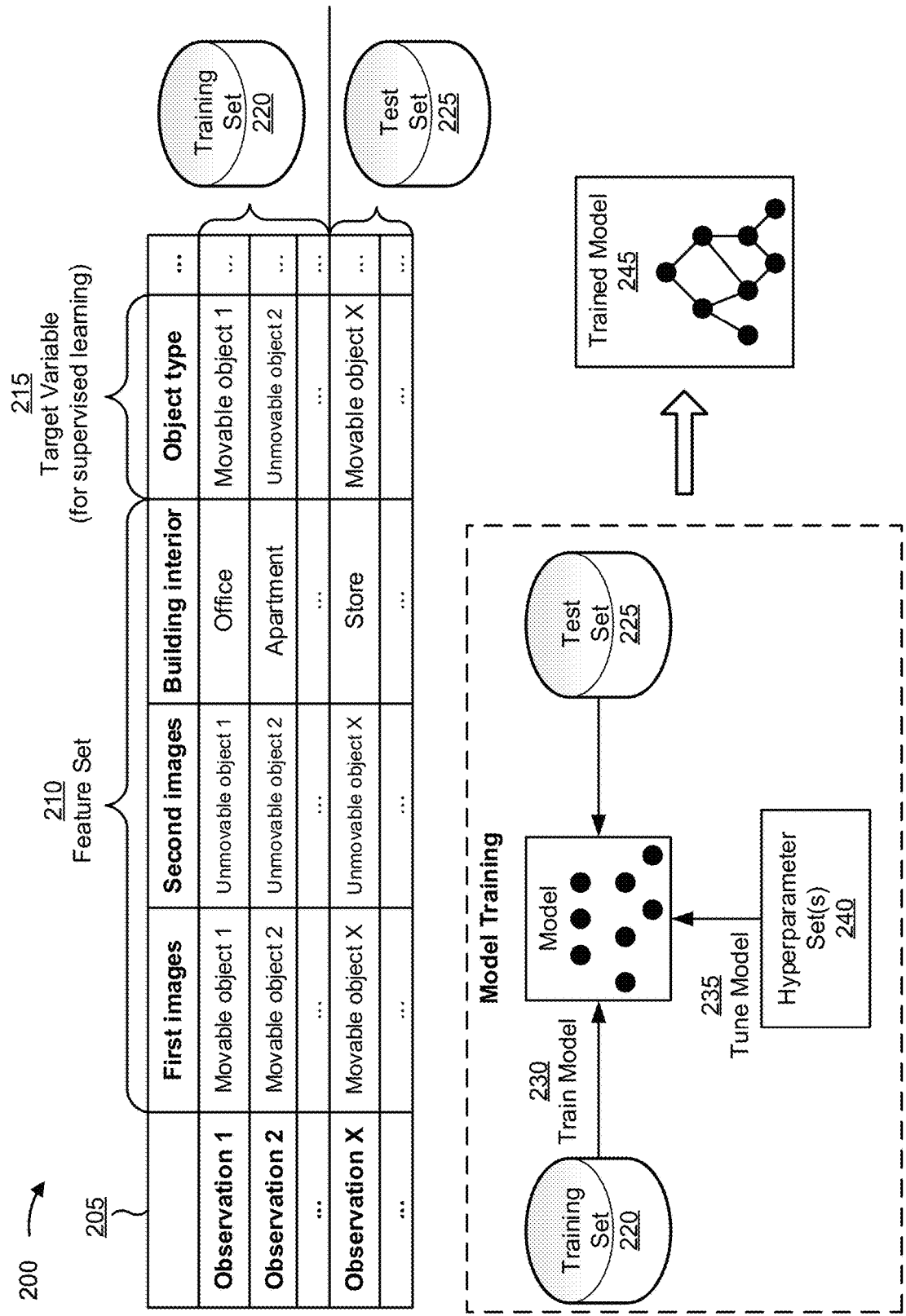
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as user device 105, location platform 110, and/or a device separate from the user device 105 and the location platform 110.

As shown by reference number 205, a machine learning model may be trained using a set of observations. The set of observations may be obtained and/or input from historical data, such as data gathered during one or more processes described herein. For example, the set of observations may include data gathered from user devices 105, as described elsewhere herein. In some implementations, the machine learning system may receive the set of observations (e.g., as input) from user devices 105.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from user device 105. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from user device 105, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of first images, a second feature of second images, a third feature of building interior, and so on. As shown, for a first observation, the first feature may have a value of movable object 1, the second feature may have a value of unmovable object 1, the third feature may have a value of office, and so on. These features and feature values are provided as examples, and may differ in other examples. For example, the feature set may include one or more of the following features: images of movable objects, images of unmovable objects, types of building interiors, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type (e.g., an object type). The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 425 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
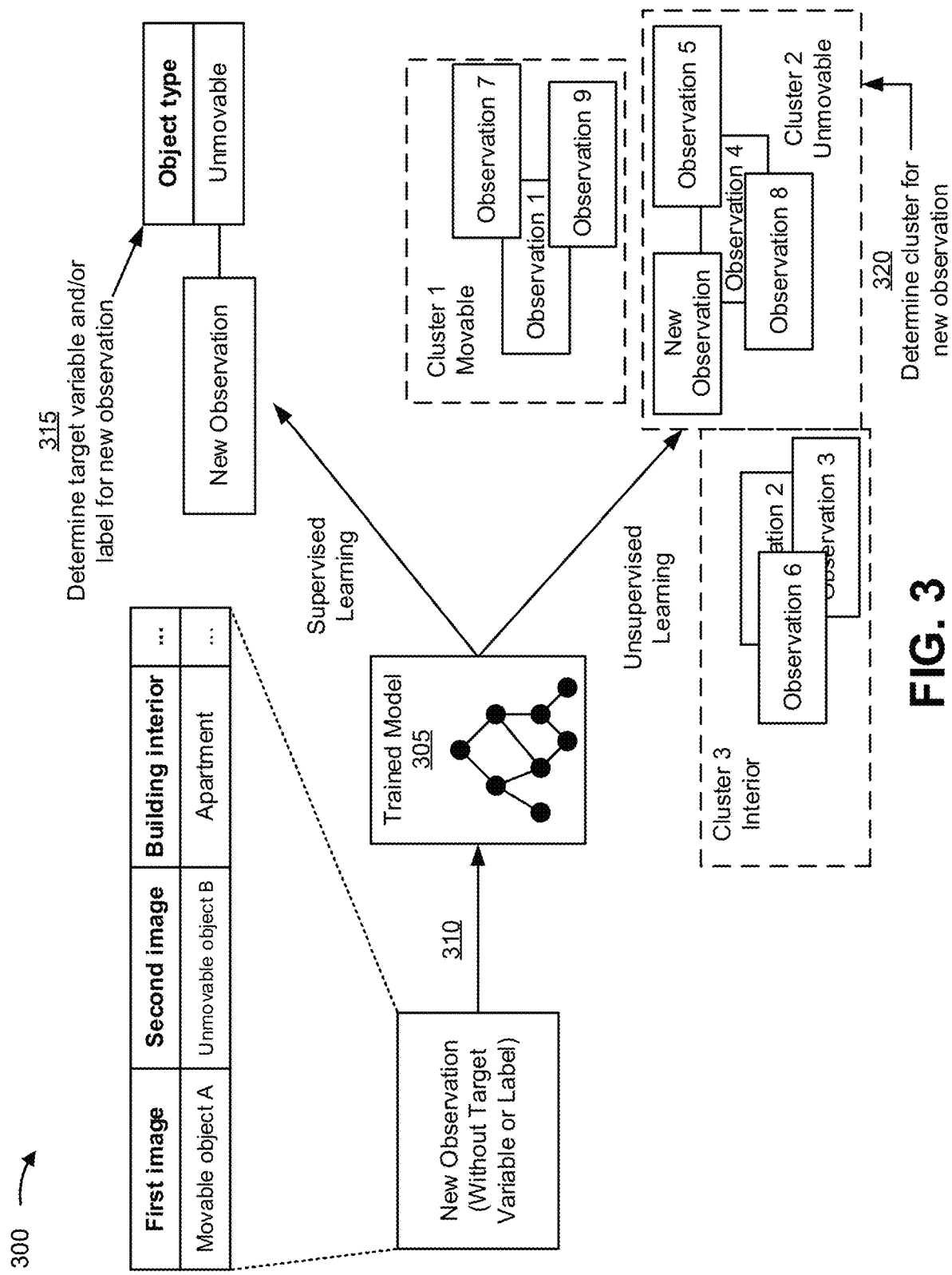
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as location platform 110.

As shown by reference number 310, the machine learning system may receive a new observation (or a set of new observations), and may input the new observation to the machine learning model 305. As shown, the new observation may include a first feature of a first image, a second feature of a second image, a third feature of an apartment, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of location Y for the target variable of an actual location for the new observation, as shown by reference number 315. Based on this prediction (e.g., based on the value having a particular label/classification, based on the value satisfying or failing to satisfy a threshold, and/or the like), the machine learning system may provide a recommendation, such as location Y is the actual location of user device 105. Additionally, or alternatively, the machine learning system may perform an automated action and/or may cause an automated action to be performed (e.g., by instructing another device to perform the automated action), such as providing the location Y to user device 105. As another example, if the machine learning system were to predict a value of location Z for the target variable of the actual location, then the machine learning system may provide a different recommendation (e.g., location Z is the actual location of user device 105) and/or may perform or cause performance of a different automated action (e.g., providing location Z to user device 105). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 may classify (e.g., cluster) the new observation in an unmovable object cluster, as shown by reference number 320. The observations within a cluster may have a threshold degree of similarity. Based on classifying the new observation in the unmovable cluster, the machine learning system may provide a recommendation, such as indicating that an object in an apartment is an unmovable object, utilizing the object with a VPS, and/or the like. Additionally, or alternatively, the machine learning system may perform an automated action and/or may cause an automated action to be performed (e.g., by instructing another device to perform the automated action), such as determining a location of user device 105. As another example, if the machine learning system were to classify the new observation in a movable object cluster, then the machine learning system may provide a different recommendation (e.g., the object in the apartment is a movable object) and/or may perform or cause performance of a different automated action (e.g., not utilizing the object with a VPS).

In this way, the machine learning system may apply a rigorous and automated process to aid a VPS with indoor wayfinding. The machine learning system enables recognition and/or identification of tens, hundreds, thousands, or millions of features and/or feature values for tens, hundreds, thousands, or millions of observations, thereby increasing an accuracy and consistency of the aid provided to the VPS relative to requiring computing resources to be allocated for tens, hundreds, or thousands of operators to manually aid the VPS using the features or feature values.

As indicated above, FIG. 3 is provided as an example. Other examples may differ from what is described in connection with FIG. 3.

Figure 4:
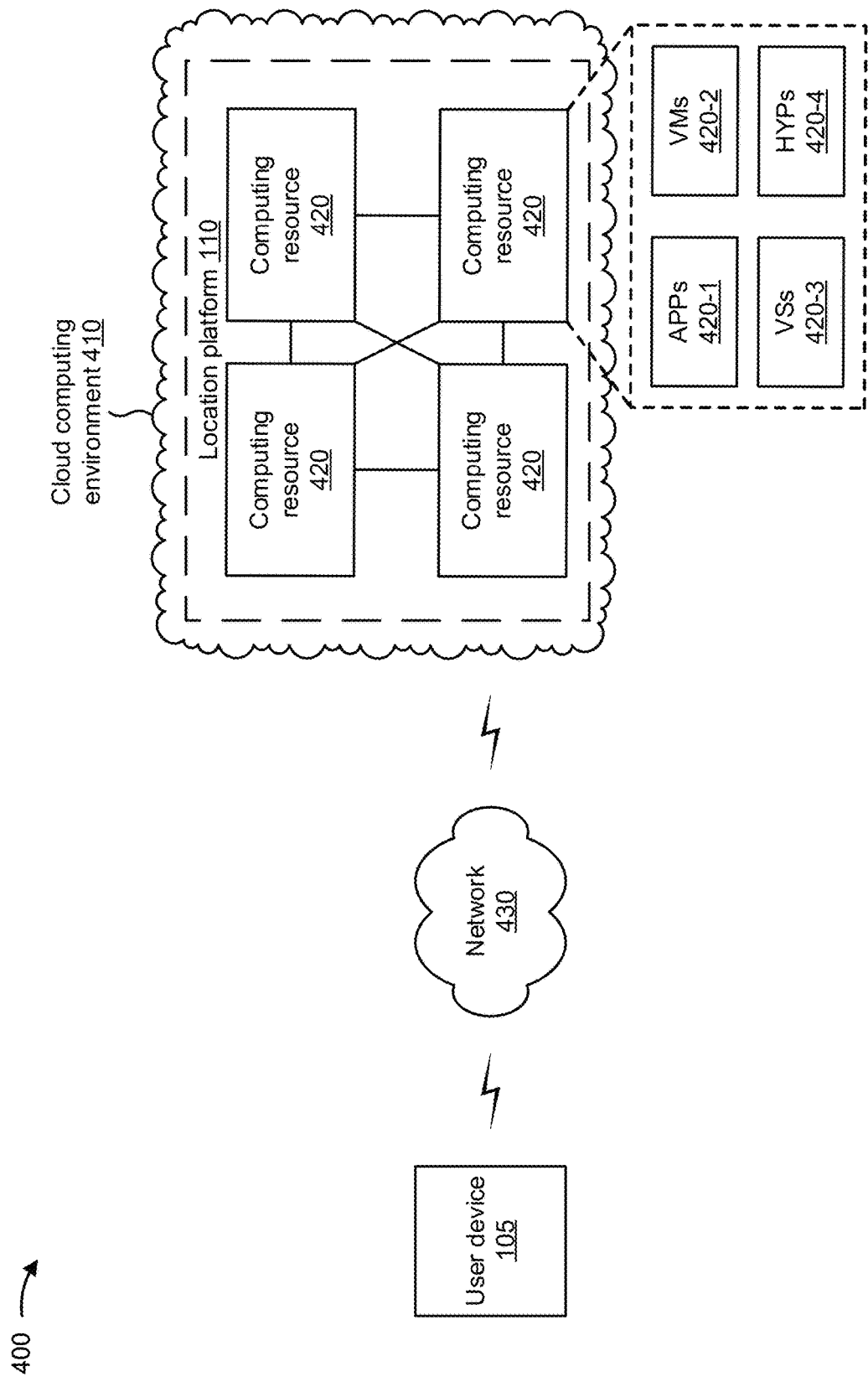
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include user device 105, location platform 110, and a network 430. Devices of environment 400 may interconnect via wired connections, wireless connections, or a combination of wired and wireless connections.

User device 105 includes one or more devices capable of receiving, generating, storing, processing, and/or providing information, such as information described herein. For example, user device 105 a mobile phone (e.g., a smart phone, a radiotelephone, and/or the like), a laptop computer, a tablet computer, a handheld computer, a gaming device, a wearable communication device (e.g., a smart watch, a pair of smart glasses, a heart rate monitor, a fitness tracker, smart clothing, smart jewelry, a head mounted display, and/or the like), a device included in user device 105 (e.g., a three-axis accelerometer, a global navigation satellite system (GNSS) device, a camera, and/or the like), or a similar type of device. In some implementations, user device 105 may receive information from and/or transmit information to location platform 110.

Location platform 110 includes one or more devices that utilize a machine learning model to aid a VPS with indoor wayfinding. In some implementations, location platform 110 may be designed to be modular such that certain software components may be swapped in or out depending on a particular need. As such, location platform 110 may be easily and/or quickly reconfigured for different uses. In some implementations, location platform 110 may receive information from and/or transmit information to one or more user devices 105.

In some implementations, as shown, location platform 110 may be hosted in a cloud computing environment 410. Notably, while implementations described herein describe location platform 110 as being hosted in cloud computing environment 410, in some implementations, location platform 110 may not be cloud-based (i.e., may be implemented outside of a cloud computing environment) or may be partially cloud-based.

Cloud computing environment 410 includes an environment that hosts location platform 110. Cloud computing environment 410 may provide computation, software, data access, storage, etc., services that do not require end-user knowledge of a physical location and configuration of system(s) and/or device(s) that hosts location platform 110. As shown, cloud computing environment 410 may include a group of computing resources 420 (referred to collectively as "computing resources 420" and individually as "computing resource 420").

Computing resource 420 includes one or more personal computers, workstation computers, mainframe devices, or other types of computation and/or communication devices. In some implementations, computing resource 420 may host location platform 110. The cloud resources may include compute instances executing in computing resource 420, storage devices provided in computing resource 420, data transfer devices provided by computing resource 420, etc. In some implementations, computing resource 420 may communicate with other computing resources 420 via wired connections, wireless connections, or a combination of wired and wireless connections.

As further shown in FIG. 4, computing resource 420 includes a group of cloud resources, such as one or more applications ("APPs") 420-1, one or more virtual machines ("VMs") 420-2, virtualized storage ("VSs") 420-3, one or more hypervisors ("HYPs") 420-4, and/or the like.

Application 420-1 includes one or more software applications that may be provided to or accessed by user device 105. Application 420-1 may eliminate a need to install and execute the software applications on user device 105. For example, application 420-1 may include software associated with location platform 110 and/or any other software capable of being provided via cloud computing environment 410. In some implementations, one application 420-1 may send/receive information to/from one or more other applications 420-1, via virtual machine 420-2.

Virtual machine 420-2 includes a software implementation of a machine (e.g., a computer) that executes programs like a physical machine. Virtual machine 420-2 may be either a system virtual machine or a process virtual machine, depending upon use and degree of correspondence to any real machine by virtual machine 420-2. A system virtual machine may provide a complete system platform that supports execution of a complete operating system ("OS"). A process virtual machine may execute a single program and may support a single process. In some implementations, virtual machine 420-2 may execute on behalf of a user (e.g., a user of user device 105 or an operator of location platform 110), and may manage infrastructure of cloud computing environment 410, such as data management, synchronization, or long-duration data transfers.

Virtualized storage 420-3 includes one or more storage systems and/or one or more devices that use virtualization techniques within the storage systems or devices of computing resource 420. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 420-4 may provide hardware virtualization techniques that allow multiple operating systems (e.g., "guest operating systems") to execute concurrently on a host computer, such as computing resource 420. Hypervisor 420-4 may present a virtual operating platform to the guest operating systems and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
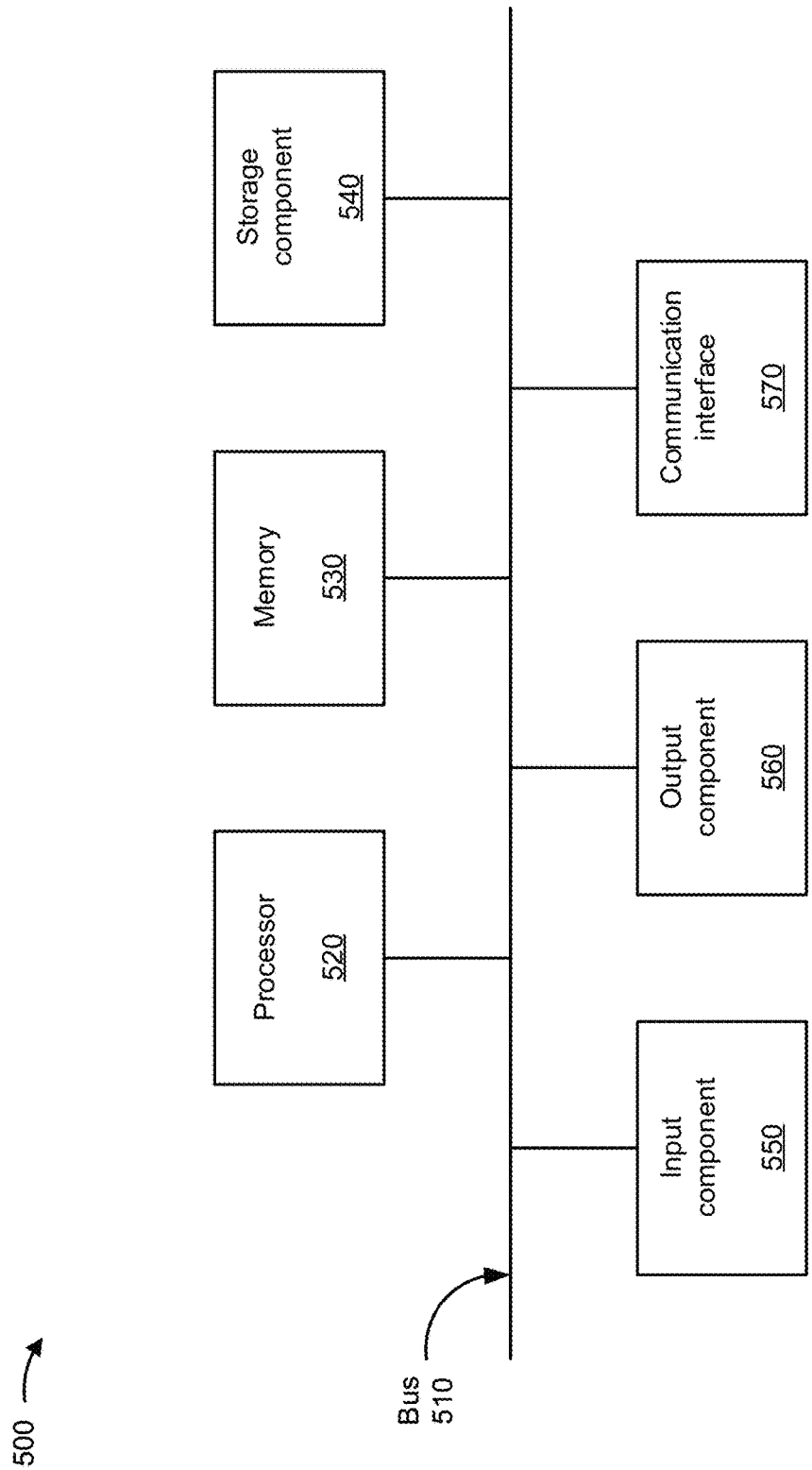
FIG. 5 is a diagram of example components of one or more devices of FIG. 2.

FIG. 5 is a diagram of example components of a device 500. Device 500 may correspond to user device 105, location platform 110, and/or computing resource 420. In some implementations, user device 105, location platform 110, and/or computing resource 420 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global navigation satellite system (GNSS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
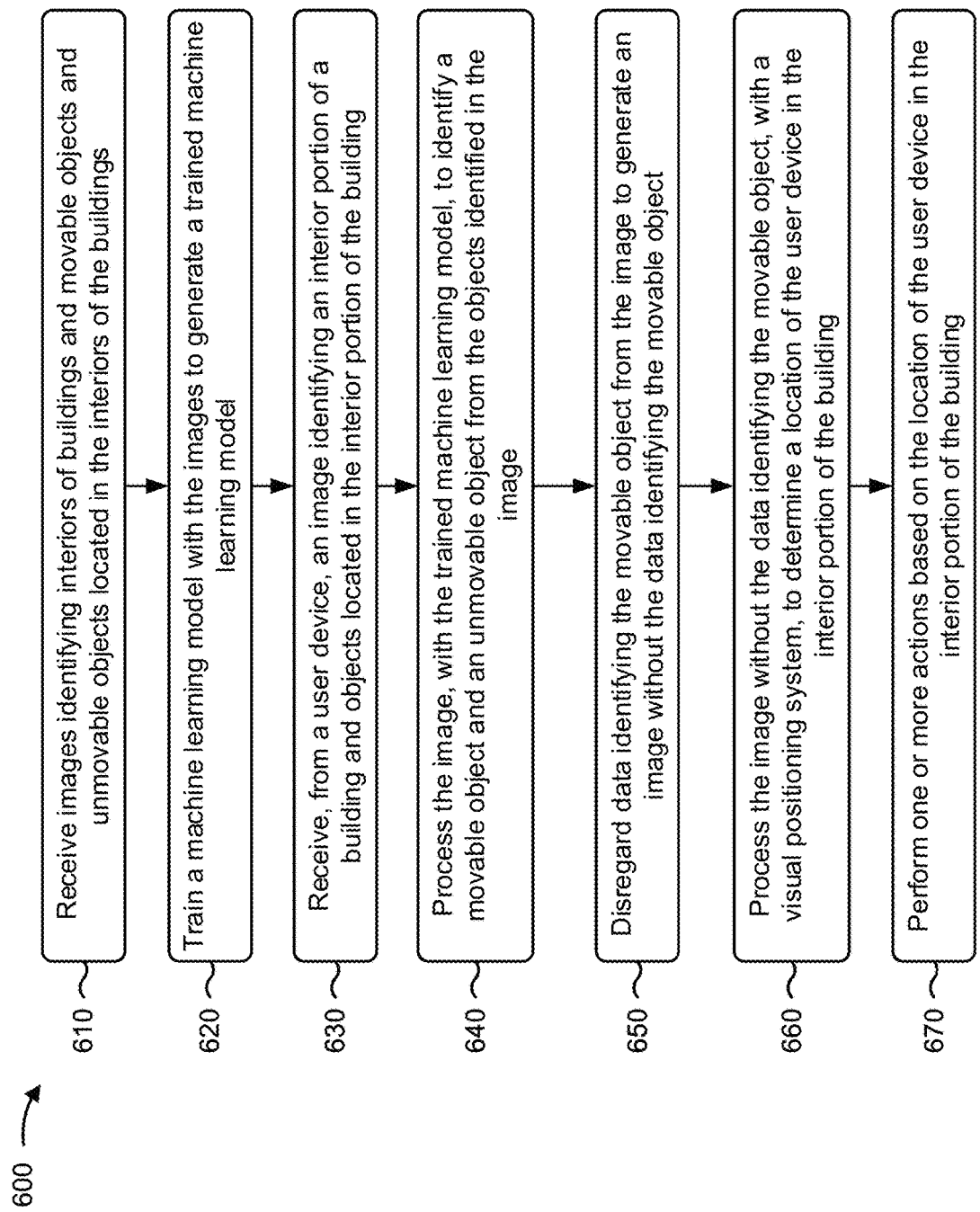
FIG. 6 is a flow chart of an example process for utilizing a machine learning model to aid a visual positioning system with indoor wayfinding.

FIG. 6 is a flow chart of an example process 600 for utilizing a machine learning model to aid a VPS with indoor wayfinding. In some implementations, one or more process blocks of FIG. 6 may be performed by a device (e.g., location platform 110). In some implementations, one or more process blocks of FIG. 6 may be performed by another device or a group of devices separate from or including the device, such as a user device (e.g., user device 105).

As shown in FIG. 6, process 600 may include receiving images identifying interiors of buildings and movable objects and unmovable objects located in the interiors of the buildings (block 610). For example, the device (e.g., using computing resource 420, processor 520, communication interface 570, and/or the like) may receive images identifying interiors of buildings and movable objects and unmovable objects located in the interiors of the buildings, as described above.

As further shown in FIG. 6, process 600 may include training a machine learning model with the images to generate a trained machine learning model (block 620). For example, the device (e.g., using computing resource 420, processor 520, memory 530, and/or the like) may train a machine learning model with the images to generate a trained machine learning model, as described above. In some implementations, the machine learning model includes one or more of: a clustering model, a computer vision model, a classifier model, or an object recognition model.

As further shown in FIG. 6, process 600 may include receiving, from a user device, an image identifying an interior portion of a building and objects located in the interior portion of the building (block 630). For example, the device (e.g., using computing resource 420, processor 520, communication interface 570, and/or the like) may receive, from a user device, an image identifying an interior portion of a building and objects located in the interior portion of the building, as described above.

As further shown in FIG. 6, process 600 may include processing the image, with the trained machine learning model, to identify a movable object and an unmovable object from the objects identified in the image (block 640). For example, the device (e.g., using computing resource 420, processor 520, storage component 540, and/or the like)

may process the image, with the trained machine learning model, to identify a movable object and an unmovable object from the objects identified in the image, as described above. In some implementations, the movable object may include a piece of furniture, a painting, a statue, or a sign.

As further shown in FIG. 6, process 600 may include disregarding data identifying the movable object from the image to generate an image without the data identifying the movable object (block 650). For example, the device (e.g., using computing resource 420, processor 520, memory 530, and/or the like) may disregard data identifying the movable object from the image to generate an image without the data identifying the movable object, as described above.

As further shown in FIG. 6, process 600 may include processing the image without the data identifying the movable object, with a visual positioning system, to determine a location of the user device in the interior portion of the building (block 660). For example, the device (e.g., using computing resource 420, processor 520, storage component 540, and/or the like) may process the image without the data identifying the movable object, with a visual positioning system, to determine a location of the user device in the interior portion of the building, as described above.

As further shown in FIG. 6, process 600 may include performing one or more actions based on the location of the user device in the interior portion of the building (block 670). For example, the device (e.g., using computing resource 420, processor 520, memory 530, storage component 540, communication interface 570, and/or the like) may perform one or more actions based on the location of the user device in the interior portion of the building, as described above. In some implementations, performing the one or more actions may include providing a user interface that includes an indication of the location of the user device; providing, to the user device, a map of the interior portion of the building and an indication of the location; or instructing a user of the user device to take an action based on the location.

In some implementations, performing the one or more actions may include recalculating walking directions for a user of the user device based on the location of the user device; retraining the visual positioning system based on the location of the user device; or retraining the machine learning model based on the location of the user device.

Process 600 may include additional implementations, such as any single implementation or any combination of implementations described above, below, and/or in connection with one or more other processes described elsewhere herein.

In some implementations, process 600 may include receiving, from the user device and prior to receipt of the image identifying the interior portion of the building, a first image of a first reference point associated with an exterior of the building; processing the first image of the first reference point, with the visual positioning system, to determine a location of a portion of the building; identifying a plurality of interior maps associated with the portion of the building based on the location of the portion of the building; receiving, from the user device, a second image identifying a second reference point associated with another interior portion of the portion of the building; and processing the second image and the plurality of interior maps, with the visual positioning system, to determine another location of the user device in the other interior portion of the portion of the building.

In some implementations, process 600 may include receiving, from the user device, a global navigation satellite system (GNSS) location of the user device, and processing the first image of the first reference point, with the visual positioning system, to determine the location of the portion of the building may include processing the first image of the first reference point, with the visual positioning system, and processing the GNSS location of the user device to determine the location of the portion of the building.

In some implementations, process 600 may include providing a user interface that includes an indication of the other location of the user device; providing, to the user device, one of the plurality of interior maps and an indication of the other location on the one of the plurality of interior maps; or instructing a user of the user device to take an action based on the other location of the user device.

In some implementations, process 600 may include receiving, from the user device, a first image of a first reference point associated with the interior portion of the building; processing the first image of the first reference point, with the visual positioning system, to determine a location of a portion of the building; receiving, from the user device, a second image identifying a second reference point associated with an exterior of the portion of the building; and processing the second image, with the visual positioning system, to determine another location of the user device at the exterior of the portion of the building.

In some implementations, process 600 may include receiving, prior to receipt of the image identifying the interior portion of the building, a signal indicating that the user device is located outside a portion of the building; identifying a plurality of interior maps associated with the portion of the building based on the user device being located outside the portion of the building; receiving, from the user device, an image identifying a reference point associated with another interior portion of the portion of the building; and processing the image identifying the reference point and the plurality of interior maps, with the visual positioning system, to determine another location of the user device in the other interior portion of the portion of the building. In some implementations, the signal indicating that the user device is located outside the portion of the building is received from a wireless access point located outside the portion of the building.

In some implementations, process 600 may include receiving a plurality of images associated with the interior of the building and with predetermined locations within the interior of the building; generating, with the visual positioning system and based on the plurality of images, a point cloud map that includes data identifying unmovable objects located in the interior of the building; and comparing the image in which the data identifying the movable object has been disregarded, with the point cloud map, to determine the location of the user device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   processing, by a device, an image identifying an interior portion of a building and objects located in the interior portion of the building to identify a movable object and an unmovable object from the objects identified in the image,
      wherein processing the image comprises differentiating between the movable object and the unmovable object based on a property of the movable object that is subject to change at a particular period of time;
   disregarding, by the device, data identifying the movable object in the image to generate an image lacking the data identifying the movable object;
   generating, by the device and based on a plurality of images, a point cloud map that includes data identifying unmovable objects located in the interior portion of the building; and
   determining, by the device, a location of a user device based on the image lacking the data identifying the movable object and the point cloud map.

2. The method of claim 1, wherein the image is received from the user device.

3. The method of claim 1, wherein processing the image is based on one or more processing techniques including:
   two-dimensional object recognition,
   three-dimensional object recognition,
   image segmentation,
   motion detection,
   video tracking, or
   feature extraction.

4. The method of claim 1, wherein disregarding the data identifying the movable object from the image to generate the image lacking the data identifying the movable object comprises:
   using a series of image processing techniques to generate a new image lacking the data identifying the movable object.

5. The method of claim 1, wherein disregarding the data identifying the movable object in the image to generate the image lacking the data identifying the movable object comprises:
   using one or more associated images to generate the image lacking the data identifying the movable object.

6. The method of claim 1, wherein generating the point cloud map comprises:
   determining a relative distance of the unmovable object to the user device.

7. The method of claim 1, wherein determining the location of the user device comprises:
   comparing the point cloud map with a historical point cloud map.

8. A non-transitory computer-readable medium storing a set of instructions, the set of instructions comprising:
   one or more instructions that, when executed by one or more processors of a device, cause the device to:
      process an image identifying an interior portion of a building and objects located in the interior portion of the building to identify a movable object and an unmovable object from the objects identified in the image,
         wherein the one or more instructions, that cause the device to process the image, cause the device to differentiate between the movable object and the unmovable object based on a property of the movable object that is subject to change at a particular period of time;
      disregard data identifying the movable object in the image to generate an image lacking the data identifying the movable object;
      generate, based on a plurality of images, a point cloud map that includes data identifying unmovable objects located in the interior portion of the building; and
      determine a location of a user device based on the image lacking the data identifying the movable object and the point cloud map.

9. The non-transitory computer-readable medium of claim 8, wherein the one or more instructions, that cause the device to process the image, cause the device to process the image based on using a machine learning model trained on identifying historical movable objects and historical unmovable objects.

10. The non-transitory computer-readable medium of claim 8, wherein the one or more instructions, that cause the device to determine the location of the user device, cause the device to:
 use information associated the unmovable object to determine a relative distance of the unmovable object to the user device.

11. The non-transitory computer-readable medium of claim 10, wherein the information associated the unmovable object includes:
 a focal length of a lens associated with the image,
 a size of the unmovable object in the image,
 an actual size of the unmovable object, or
 an actual location of the unmovable object.

12. The non-transitory computer-readable medium of claim 8, wherein the one or more instructions further cause the device to one or more of:
 provide a user interface that includes an indication of the location of the user device,
 provide a map of the interior portion of the building and the indication of the location; or
 provide an instruction to take an action based on the location,
 recalculate directions for a user of the user device based on the location;
 retrain a visual positioning system based on the location; or
 train a machine learning model based on the location.

13. The non-transitory computer-readable medium of claim 8, wherein the unmovable object is classified as the unmovable object based on one or more of:
 one or more attributes of the unmovable object,
 one or more attributes of the building, or
 one or more attributes of an environment associated with the unmovable object.

14. The non-transitory computer-readable medium of claim 8, wherein the movable object includes an object likely to move within a threshold period of time.

15. A device, comprising:
 one or more processors configured to:
  process an image identifying an interior portion of a building and objects located in the interior portion of the building to identify a movable object and an unmovable object from the objects identified in the image,
   wherein the one or more processors, to process the image, are configured to differentiate between the movable object and the unmovable object based on a property of the movable object that is subject to change at a particular period of time;
  disregard data identifying the movable object in the image to generate an image lacking the data identifying the movable object;
  generate, based on a plurality of images, a point cloud map that includes data identifying unmovable objects located in the interior portion of the building; and
  determine a location of a user device based on the image lacking the data identifying the movable object and the point cloud map.

16. The device of claim 15, wherein the unmovable object includes an object that is unlikely to move within a threshold distance or a threshold period of time.

17. The device of claim 15, wherein the one or more processors, to process the image, are configured to determine a degree of accuracy associated with identifying the movable object.

18. The device of claim 15, wherein the one or more processors, to disregard the data identifying the movable object in the image to generate the image lacking the data identifying the movable object, are configured to:
 use one or more associated historical images to generate the image lacking the data identifying the movable object.

19. The device of claim 15, wherein the one or more processors are further configured to:
 train a machine learning model based on identifying the movable object and the unmovable object.

20. The device of claim 15, wherein the one or more processors, to determine the location of the user device, are configured to:
 compare the image lacking the data identifying the movable object with the point cloud map.

* * * * *